US012251904B2

(12) United States Patent
Uchiyama et al.

(10) Patent No.: US 12,251,904 B2
(45) Date of Patent: Mar. 18, 2025

(54) RECORDING MEDIUM PROCESSING APPARATUS AND IMAGE FORMING SYSTEM

(71) Applicant: FUJIFILM Business Innovation Corp., Tokyo (JP)

(72) Inventors: Takayuki Uchiyama, Kanagawa (JP); Masashi Matsumoto, Kanagawa (JP); Takumi Uegane, Kanagawa (JP); Satoko Monoe, Kanagawa (JP); Mitsuhiro Nakamura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 444 days.

(21) Appl. No.: 17/728,925

(22) Filed: Apr. 25, 2022

(65) Prior Publication Data

US 2023/0114885 A1 Apr. 13, 2023

(30) Foreign Application Priority Data

Oct. 8, 2021 (JP) ................................ 2021-166507

(51) Int. Cl.
*B31F 5/02* (2006.01)
*B65H 37/04* (2006.01)

(52) U.S. Cl.
CPC ............... *B31F 5/02* (2013.01); *B65H 37/04* (2013.01); *B31F 2201/0779* (2013.01); *B65H 2301/43828* (2013.01); *B65H 2301/51616* (2013.01); *B65H 2801/27* (2013.01)

(58) Field of Classification Search
CPC ...... B31F 1/07; B31F 5/02; B31F 2201/0754; B31F 2201/0779; B65H 2301/43828; B65H 2301/51616; B65H 2801/27; G03G 15/6544; G03G 2215/00852
USPC ........................................................ 270/58.08
See application file for complete search history.

(56) References Cited

U.S. PATENT DOCUMENTS

| | | | | |
|---|---|---|---|---|
| 10,046,938 | B2 * | 8/2018 | Komiyama | B65H 31/38 |
| 10,234,808 | B2 * | 3/2019 | Ishihara | G03G 15/6541 |
| 10,481,542 | B2 * | 11/2019 | Kobayashi | G03G 15/6541 |
| 10,632,706 | B2 * | 4/2020 | Makita | B65H 37/04 |
| 11,130,308 | B2 * | 9/2021 | Suzuki | B65H 37/04 |

FOREIGN PATENT DOCUMENTS

| | | |
|---|---|---|
| JP | 2014019526 | 2/2014 |
| JP | 2014105071 | 6/2014 |
| JP | 6744349 | 8/2020 |

* cited by examiner

*Primary Examiner* — Leslie A Nicholson, III
(74) *Attorney, Agent, or Firm* — JCIPRNET

(57) ABSTRACT

A recording medium processing apparatus includes first teeth that are used for binding processing of a recording medium bundle; second teeth that move toward the first teeth and press the recording medium bundle located between the first teeth and the second teeth; a position detection unit that detects a position of the second teeth; and a control unit that controls movement of the second teeth on the basis of the position detected by the position detection unit.

15 Claims, 17 Drawing Sheets

RECORDING MEDIUM PROCESSING APPARATUS AND IMAGE FORMING SYSTEM

CROSS-REFERENCE TO RELATED APPLICATIONS

This application is based on and claims priority under 35 USC 119 from Japanese Patent Application No. 2021-166507 filed Oct. 8, 2021.

BACKGROUND

(i) Technical Field

The present invention relates to a recording medium processing apparatus and an image forming system.

(ii) Related Art

JP2014-105071A discloses a sheet processing apparatus including binding means for binding a bundle of sheets constituted by a plurality of sheets, driving means for driving the binding means, and a power source that supplies electric power to the driving means.

JP6744349B discloses a sheet processing apparatus having control means for that controlling binding means so that the number of times of binding of the binding means can be changed depending on the information on the basis weight of an outermost sheet of a sheet bundle acquired by acquisition means.

JP2014-19526A discloses a sheet processing apparatus including a pair of pressing members having roughness on a surface, and a pressing force application unit that applies a pressing force to the pressing members to press a sheet bundle inserted between the pressing members from a thickness direction and binds the sheet bundle.

SUMMARY

In binding processing for a recording medium bundle, this binding processing may be performed by moving teeth for binding.

In actual binding processing, the state of the recording medium bundle may vary for each recording medium bundle, or the teeth may not move as intended. In this case, a situation in which a state in a case where the binding processing of the recording medium bundle is performed is different from a state that is appropriate for the binding may occur.

Aspects of non-limiting embodiments of the present disclosure relate to a recording medium processing apparatus and an image forming system that suppress a situation in which a state in which binding processing of a recording medium bundle is performed is away from a state appropriate for binding, as compared to a case where information on teeth used for binding the recording medium bundle is not taken into consideration.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a recording medium processing apparatus includes first teeth that are used for binding processing of a recording medium bundle; second teeth that move toward the first teeth and press the recording medium bundle located between the first teeth and the second teeth; a position detection unit that detects a position of the second teeth; and a control unit that controls movement of the second teeth on the basis of the position detected by the position detection unit.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments of the present invention will be described in detail with reference to the accompanying drawings.

Figure 1:
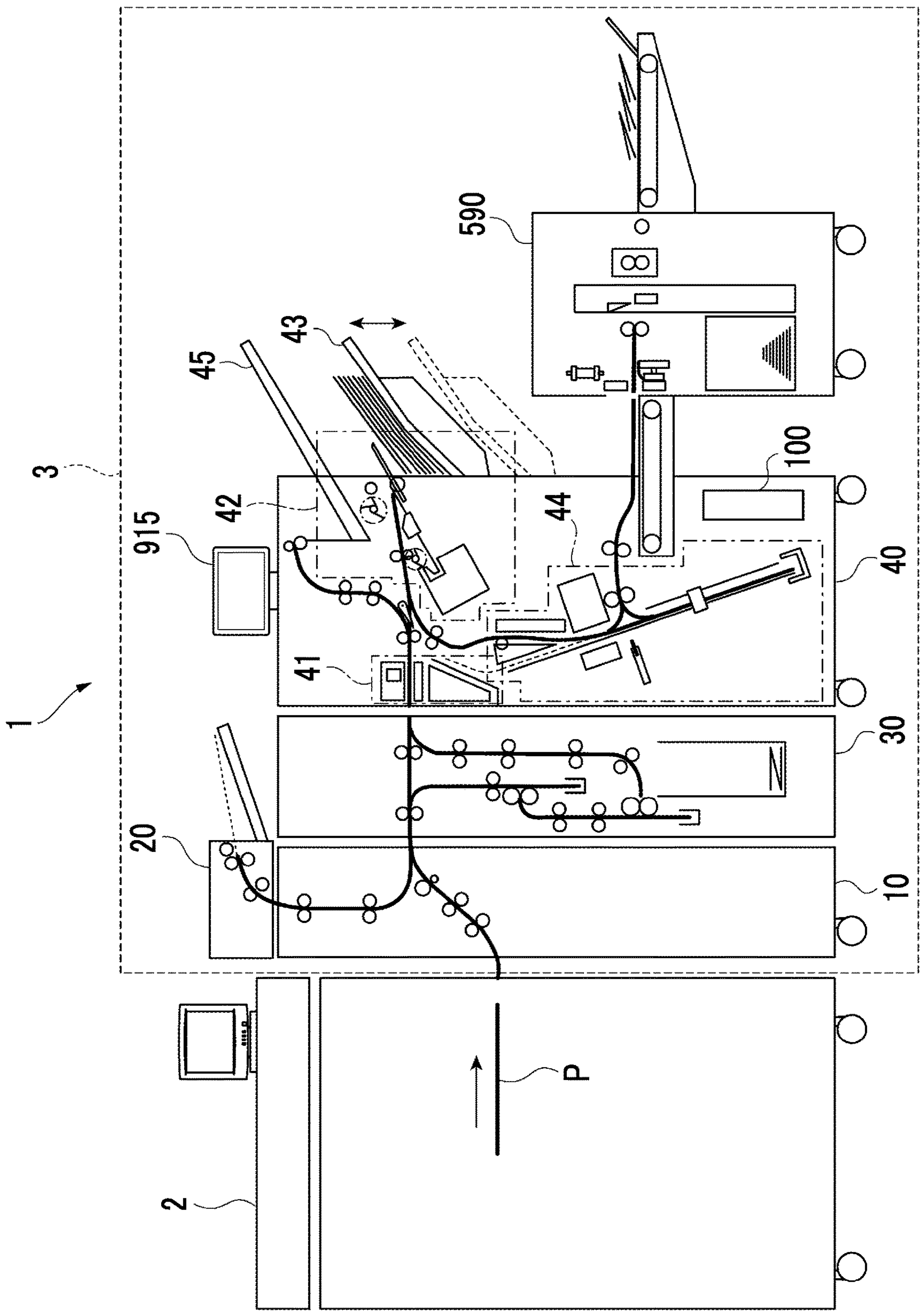
FIG. 1 is a diagram illustrating an overall configuration of an image forming system.

FIG. 1 is a diagram illustrating an overall configuration of an image forming system 1.

The image forming system 1 illustrated in FIG. 1 includes an image forming apparatus 2 that forms an image on paper P as an example of a recording medium and a paper processing apparatus 3 that performs predetermined processing on the paper P on which the image has been formed by the image forming apparatus 2.

Here, the image forming apparatus 2 forms the image on the paper P by using an electrophotographic method or an ink jet method.

The paper processing apparatus 3 as an example of a recording medium processing apparatus is provided a transport device 10 that transports the paper P output from the image forming apparatus 2 to the downstream side, and an interleaf paper supply device 20 that supplies interleaf paper such as thick paper or paper P with a window to the paper P transported by the transport device 10.

Additionally, the paper processing apparatus 3 is provided with a folding device 30 that performs folding processing such as inner tri-folding (C-folding) or outer tri-folding (Z-folding) on the paper P transported from the transport device 10.

Additionally, the paper processing apparatus 3 is provided with a first post-processing device 40 that is provided on the downstream side of the folding device 30 and that performs punching, end binding, saddle binding, and the like on the paper P. In addition, the first post-processing device 40, which performs processing on a paper bundle (an example of a recording medium bundle) including a plurality of sheets of paper P on which images are formed by the image forming apparatus 2 and performs processing for the paper P on each sheet of paper P, is provided on the downstream side of the folding device 30.

Additionally, the paper processing apparatus 3 is provided with a second post-processing device 590 that is provided on the downstream side of the first post-processing device 40 and further performs processing on the paper bundle that is center-folded or saddle-bounded.

Additionally, the paper processing apparatus 3 is provided with an information processing unit 100 constituted by a central processing unit (CPU) that executes a program and controls the entire paper processing apparatus 3.

The first post-processing device 40 is provided with a punching unit 41 that performs punching the paper P and an end-binding stapler unit 42 that binds the end of the paper bundle.

Additionally, a first stacking part 43 on which the paper P that has passed through the end-binding stapler unit 42 is stacked, and a second stacking part 45 on which the paper P on which the processing in the first post-processing device 40 is not performed or the paper P on which only the punching is performed is stacked are provided.

Moreover, the first post-processing device 40 is provided with a saddle binding unit 44 that center-fold or saddle-binds the paper bundle to produce a spread-like booklet.

Figure 2:
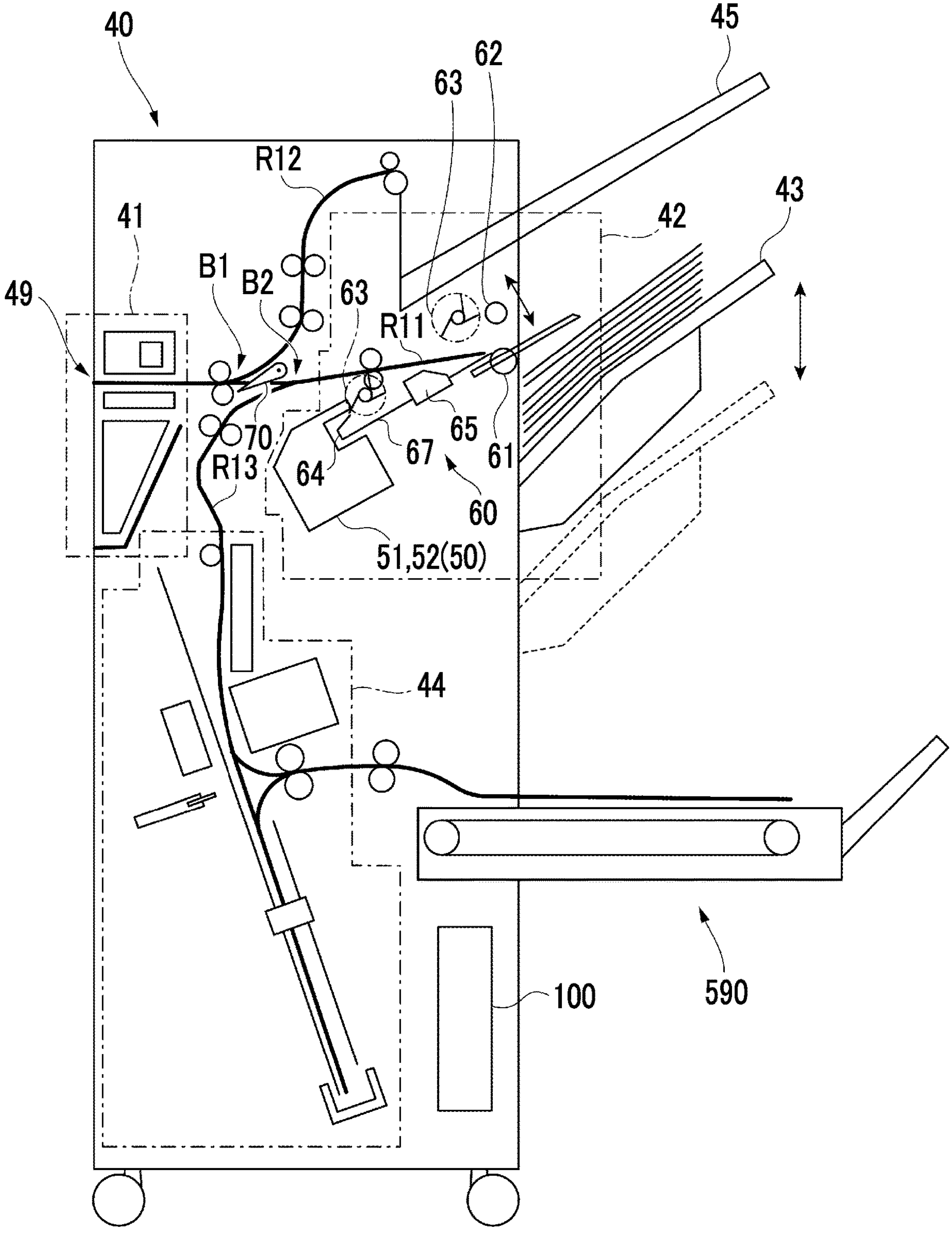
FIG. 2 is a diagram illustrating a configuration of a first post-processing device.

FIG. 2 is a diagram illustrating the configuration of the first post-processing device 40.

The first post-processing device 40 is provided with a receiving port 49 that receives the paper P transported from the folding device 30. The punching unit 41 is provided immediately behind the receiving port 49. The punching unit 41 performs punching for two or four holes on the paper P transported to the first post-processing device 40.

Additionally, a first paper transport route R11, which is provided from the receiving port 49 to the end-binding stapler unit 42 and is used for transporting the paper P received at the receiving port 49 to the end-binding stapler unit 42, is provided.

Moreover, a first branch part B1 is provided with a second paper transport route R12 that branches from the first paper transport route R11 and is used for transporting the paper P to the second stacking part 45.

Additionally, a second branch part B2 is provided with a third paper transport route R13 that branches from the first paper transport route R11 and is used for transporting the paper P to the saddle binding unit 44.

Additionally, a switching gate 70 that switches (sets) a transport destination of the paper P to any one of the first paper transport route R11 to the third paper transport route R13 is provided.

The end-binding stapler unit 42 is provided with the paper stacking section 60 that stacks a required number of sheets of paper P to generate the paper bundle.

The paper stacking section 60 is provided with a support plate 67 that is disposed to be inclined with respect to the horizontal direction and supports the transported paper P from below. In the present exemplary embodiment, the paper bundle is generated on the support plate 67.

Moreover, the end-binding stapler unit 42 is provided with a binding processing device 50 that executes binding (end binding) on an end part of the paper bundle generated at the paper stacking section 60.

In addition, in the present exemplary embodiment, as will be described below, two binding processing devices 50 are provided, including a first binding processing device 51 that performs binding processing using staples and a second binding processing device 52 that performs binding processing without using staples.

Additionally, the end-binding stapler unit 42 is provided with a transport roll 61 that performs rotational driving and delivers the paper bundle generated at the paper stacking section 60 to the first stacking part 43. Moreover, a movable roll 62 is provided that is movable to a position where the movable roll has retreated from the transport roll 61 and a position where the movable roll is brought into pressure contact with the transport roll 61.

Here, in a case where the processing is performed by the end-binding stapler unit 42, first, the transported paper P is received at the receiving port 49.

Thereafter, the paper P is transported along the first paper transport route R11 and reaches the end-binding stapler unit 42.

Then, the paper P is transported to a position above the support plate 67 and then falls onto the support plate 67. Additionally, the paper P is supported from below by the support plate 67 and slidingly moves on the support plate 67 by the inclination given to the support plate 67 and a rotating member 63.

Thereafter, the paper P bumps against an end guide 64 attached to an end part of the support plate 67. In addition, in the present exemplary embodiment, the end part of the support plate 67 is provided with the end guide 64 extending upward in the drawing, and the paper P that has moved on the support plate 67 bumps against the end guide 64.

Accordingly, in the present exemplary embodiment, the movement of the paper P is stopped. Thereafter, this operation is performed whenever the paper P is transported from the upstream side, and the paper bundle in which the paper P is aligned is generated on the support plate 67.

In addition, in the present exemplary embodiment, a paper width position alignment member 65 that aligns the position of the paper bundle in the width direction is further provided.

In the present exemplary embodiment, whenever the paper P is supplied onto the support plate 67, an end part (side portion) of the paper P in the width direction is pressed by the paper width position alignment member 65, and the position of the paper P (paper bundle) in the width direction is also aligned.

In a case where a predetermined number of sheets of paper P are stacked on the support plate 67, the first binding processing device 51 and the second binding processing device 52 execute binding on the end part of the paper bundle.

In addition, the first binding processing device 51 executes binding by driving metallic staples (U-shaped needles) into the paper bundle. Additionally, the second binding processing device 52 executes binding by sandwiching the paper bundle between two binding teeth and pressure-bonding paper sheets constituting the paper bundle to each other.

Thereafter, in the present exemplary embodiment, the movable roll 62 advances toward the transport roll 61, and the paper bundle is sandwiched between the movable roll 62 and the transport roll 61. Thereafter, the transport roll 61 perform rotational driving, and the paper bundle is transported to the first stacking part 43.

In addition, the first binding processing device 51 and the second binding processing device 52 are provided so as to be movable toward the far side and the near side of the paper plane in the drawing, and in the present exemplary embodiment, the binding processing on the paper P can be performed in a plurality of points.

Figure 3:
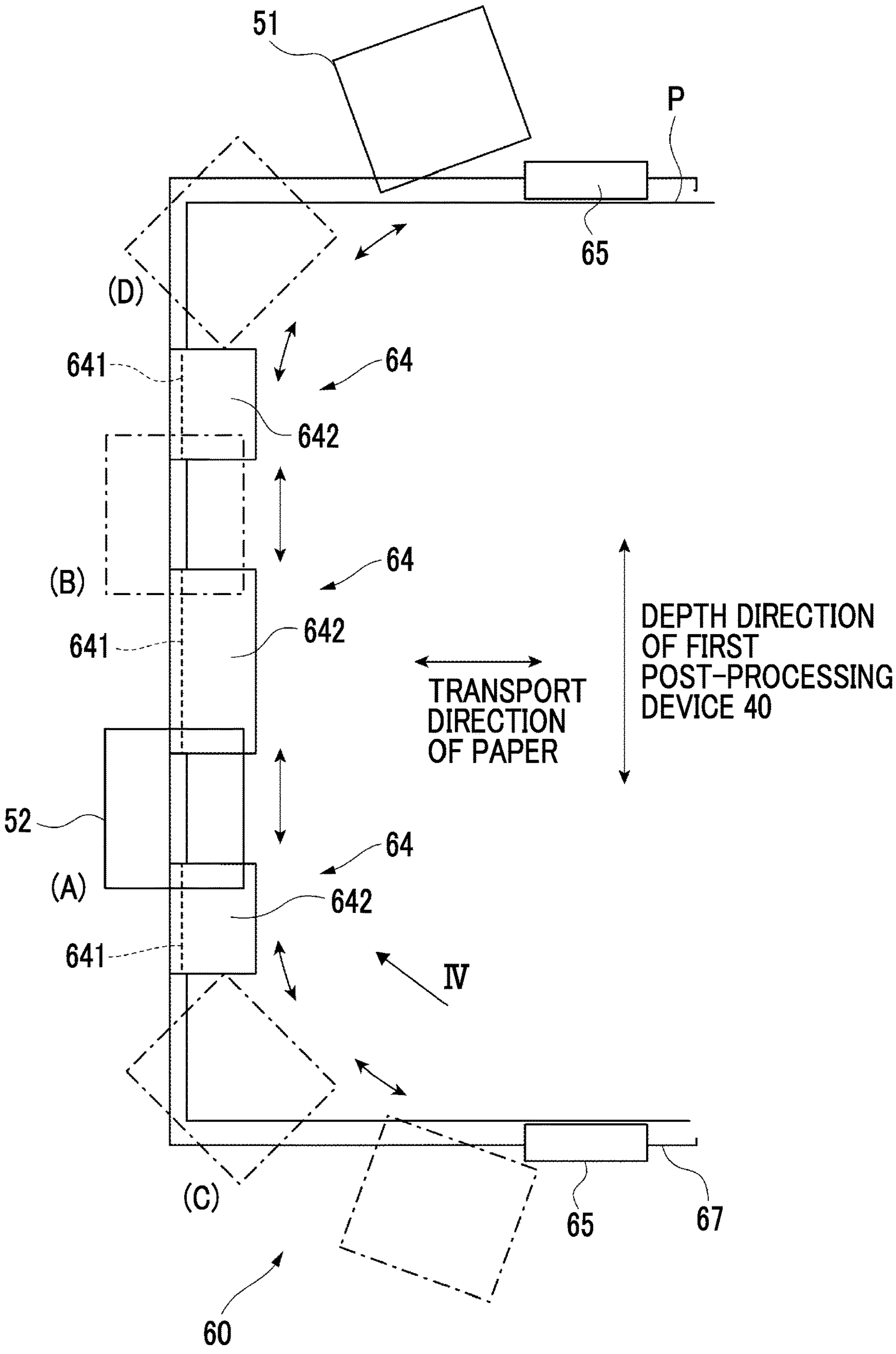
FIG. 3 is a diagram in a case where a paper stacking section is viewed from above.

Referring to and further describing FIG. 3 (a diagram in a case where the paper stacking section 60 is viewed from above), in the present exemplary embodiment, as described above, the first binding processing device 51 and the second binding processing device 52 are provided.

The first binding processing device 51 and the second binding processing device 52 are disposed such that the positions of the first post-processing device 40 in the depth direction are different from each other.

In the present exemplary embodiment, the first binding processing device 51 and the second binding processing device 52 move in the depth direction of the first post-processing device 40, which is a direction orthogonal to the transport direction of the paper P (paper bundle).

Additionally, in the present exemplary embodiment, the first binding processing device 51 and the second binding processing device 52 move along one common route.

In the present exemplary embodiment, the first binding processing device 51 and the second binding processing device 52 are movable and can perform binding processing on a plurality of points of the paper bundle.

Here, the first binding processing device 51 and the second binding processing device 52 respectively stop at, for example, two points located at mutually different points in the depth direction of the first post-processing device 40 (position (A) and position (B) in FIG. 3) and perform binding processing (two-point end binding processing) at these two points.

Additionally, each of the first binding processing device 51 and the second binding processing device 52 stops at, for example, one end (one corner portion of the paper bundle) (position (D) in FIG. 3) of the paper bundle, and binding processing (single-point end binding) is performed at this stop position.

Additionally, each of the first binding processing device 51 and the second binding processing device 52 stops at, for example, the other end (the other corner portion of the paper bundle) (position (C) in FIG. 3) of the paper bundle, and binding processing (single-point end binding) is performed at this stop position.

Here, in the present exemplary embodiment, each of the first binding processing device 51 and the second binding processing device 52 moves linearly between the position (A) and the position (B), and each of the first binding processing device 51 and the second binding processing device 52 moves while rotating by, for example, 45° between the position (A) and the position (C) and between the position (B) and the position (D).

In the present exemplary embodiment, as illustrated in FIG. 3, a plurality of the end guides 64 are provided.

The end guides 64 are disposed at mutually different points in the depth direction (the direction orthogonal to the transport direction of the paper P) of the first post-processing device 40.

Additionally, each of the end guides 64 has a restricting portion 641 and a facing piece 642 as illustrated in FIG. 3.

The restricting portion 641 is disposed in a relationship orthogonal to the support plate 67, and in the present exemplary embodiment, the movement of the paper P is restricted by the end part of the paper P bumping against the restricting portion 641.

The facing piece 642 is connected to the restricting portion 641 and is disposed to face the support plate 67.

In the present exemplary embodiment, in a case where the paper P is placed on the support plate 67, the end part of the paper P enters between the facing piece 642 and the support plate 67. Moreover, the end part of the paper P bumps against the restricting portion 641. Accordingly, the paper P is aligned.

In addition, in a case where the binding processing is performed at the position (A) in FIG. 3, the binding processing is performed through a gap formed between the facing piece 642 located at the center (the center in the upward-downward direction) in FIG. 3 and the facing piece 642 located at a lower portion in the drawing.

Additionally, in a case where the binding processing is performed at the position (B) in FIG. 3, the binding processing is performed through a gap formed between the facing piece 642 located in the upper portion of FIG. 3 and the facing piece 642 located in the center in the drawing.

Figure 4:
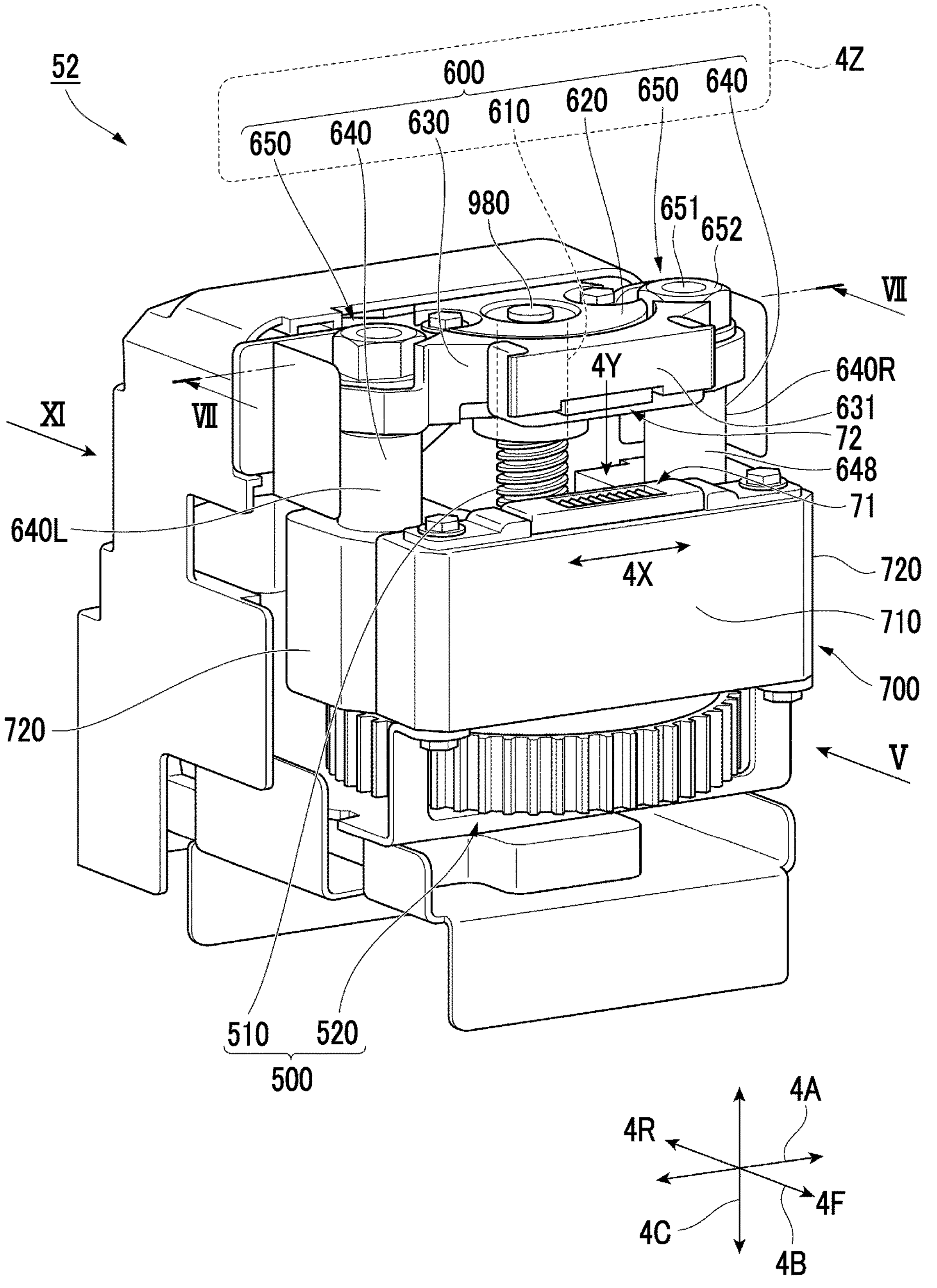
FIG. 4 is a diagram in a case where a second binding processing device is viewed from a direction indicated by arrow IV in FIG. 3.
Figure 5:
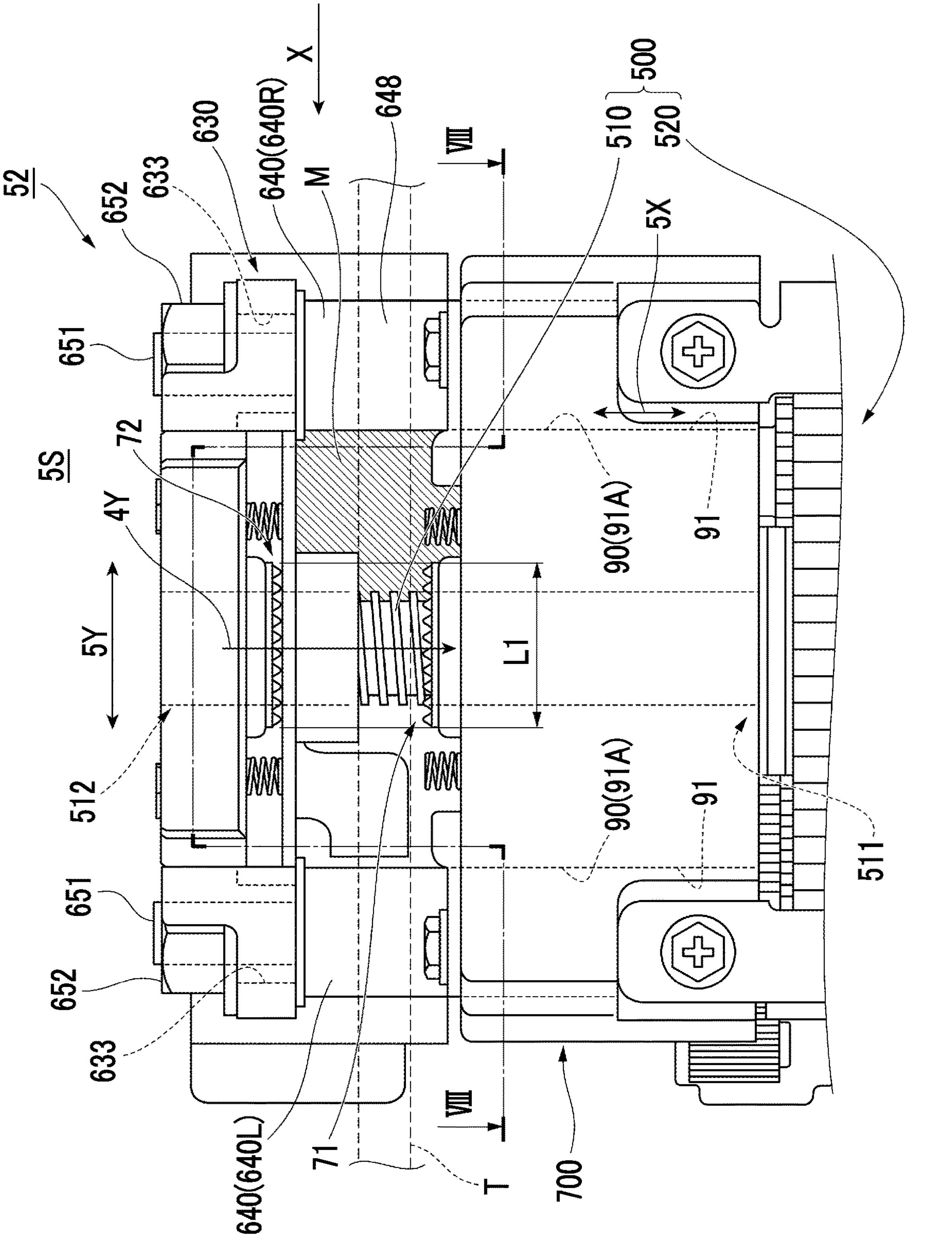
FIG. 5 is a diagram in a case where the second binding processing device is viewed from the direction of arrow V in FIG. 4.

FIG. 4 is a diagram in a case where the second binding processing device 52 is viewed from a direction indicated by arrow IV in FIG. 3. FIG. 5 is a diagram in a case where the second binding processing device 52 is viewed from the direction of arrow V in FIG. 4. In addition, FIG. 5 is a diagram in a case where the second binding processing device 52 is viewed from the front.

In addition, in FIG. 4, a direction indicated by arrow 4A is hereinafter referred to as a width direction of the second binding processing device 52, and a direction indicated by arrow 4B is referred to as a depth direction of the second binding processing device 52. Additionally, a direction indicated by arrow 4C is referred to as a height direction of the second binding processing device 52.

Additionally, in the present specification, a direction indicated by arrow 4R in the drawing is referred to as a rear direction or a rear side, and a direction indicated by arrow 4F in the drawing is referred to as a front direction or a front side.

As illustrated in FIG. 4, the second binding processing device 52 is provided with first binding teeth 71 used for binding processing of a paper bundle T (refer to FIG. 5) that is an example of the recording medium bundle. Additionally, second binding teeth 72 are provided above the first binding teeth 71.

Each of the first binding teeth 71 as an example of first teeth and the second binding teeth 72 as an example of second teeth is provided with an uneven portion.

The surface of the first binding teeth 71 located on the side of the second binding teeth 72 and the surface of the second binding teeth 72 located on the side of the first binding teeth 71 are provided with an uneven portion in which a convex portion and a concave portion are alternately lined up in the direction indicated by arrow 4X in the drawing.

In other words, the surface of the first binding teeth 71 located on the side of the second binding teeth 72 and the surface of the second binding teeth 72 located on the side of the first binding teeth 71 are provided with an uneven portion in which a convex portion and a concave portion are alternately lined up in a longitudinal direction of the first binding teeth 71 and the second binding teeth 72.

In a case where the binding processing is performed by the first binding teeth 71 and the second binding teeth 72, in the present exemplary embodiment, the second binding teeth 72 advance toward the first binding teeth 71.

More specifically, in the present exemplary embodiment, in a case where the binding processing is performed, the second binding teeth 72 moves down along a linear route indicated by arrow 4Y in the drawing (hereinafter, referred to as a "linear route 4Y"), and moves toward the first binding teeth 71.

Then, in the present exemplary embodiment, the paper bundle T located between the first binding teeth 71 and the second binding teeth 72 is sandwiched and pressed by the first binding teeth 71 and the second binding teeth 72.

In this case, in the present exemplary embodiment, the convex portions provided on the first binding teeth 71 and the concave portions provided on the second binding teeth 72 face each other. Additionally, in this case, the concave portions provided on the first binding teeth 71 and the convex portions provided on the second binding teeth 72 face each other.

Additionally, the convex portions provided on one binding teeth enter the concave portions provided on the other binding teeth. Accordingly, sheets of the paper P constituting the paper bundle T are pressure-bonded to each other, and the binding processing of the paper P is performed. Thereafter, in the present exemplary embodiment, the second binding teeth 72 move upward and retreat from the first binding teeth 71.

In addition, in the present exemplary embodiment, a case where the convex portions and the concave portions are alternately lined up in the first binding teeth 71 and the second binding teeth 72, respectively, has been described as an example. However, the convex portions and the concave portions may be disposed by another line-up method.

Additionally, for example, in a case where the paper bundle T is pressed by the first binding teeth 71 and the second binding teeth 72, the binding processing may be performed by cutting a part of the paper bundle T to form a strip-shaped piece, forming a through-hole may be formed in the paper bundle T, and passing the strip-shaped piece through the through-hole.

The method of binding processing by the first binding teeth 71 and the second binding teeth 72 is not particularly limited.

As illustrated in FIG. 4, the second binding processing device 52 is provided with a moving mechanism 500 as an example of a moving unit that moves the second binding teeth 72 toward the first binding teeth 71.

The moving mechanism 500 includes a rod-shaped screw member 510 extending in the upward-downward direction in the drawing, and the screw member 510 is rotated in the circumferential direction so as to move the second binding teeth 72 toward the first binding teeth 71.

The screw member 510 is made of metal. Additionally, the screw member 510 is formed in a straight shape.

Additionally, spiral convex portions and groove portions are formed on an outer peripheral surface of the screw member 510. In other words, the outer peripheral surface of the screw member 510 is provided with a male screw in which the convex portions and the groove portions are lined up at predetermined regular intervals in the axial direction of the screw member 510. The convex portions and the groove portions are alternately disposed In the axial direction of the screw member 510.

Additionally, the screw member 510 of the present exemplary embodiment is a screw conforming to the JIS standard. Additionally, the type of the screw member 510 is not particularly limited, but for example, a trapezoidal screw is used. Additionally, the screw member 510 is not limited to being provided by the screw alone but may be integrated with a member having another function.

Additionally, the screw member 510 is disposed along the linear route 4Y in which the second binding teeth 72 moves.

Additionally, in the present exemplary embodiment, a multi-thread screw is used as the screw member 510. More specifically, in the present exemplary embodiment, a double-thread screw is used as the screw member 510. In the present exemplary embodiment, the "multi-thread screw" refers to a screw having two or more spirals in one pitch.

Additionally, in the present exemplary embodiment, an interlocking portion 600 that moves in conjunction with the second binding teeth 72 is provided. Moreover, the screw member 510 meshes with the interlocking portion 600. In other words, the screw member 510 is connected to the interlocking portion 600.

More specifically, the interlocking portion 600 is provided with a female thread portion 610, and the screw member 510 that is a male screw meshes with the portion of the interlocking portion 600 where the female thread portion 610 is provided.

The moving mechanism 500 rotates the screw member 510 meshing with the female thread portion 610 in the circumferential direction to move the second binding teeth 72 toward the first binding teeth 71.

More specifically, in the present exemplary embodiment, in a case where a drive motor M to be described below is rotated forward, the screw member 510 rotates in one direction in the circumferential direction.

Accordingly, the interlocking portion 600 and the second binding teeth 72 move downward, and the second binding teeth 72 are moved to the first binding teeth 71. Accordingly, the binding processing is performed.

In the present exemplary embodiment, in a case where the screw member 510 rotates in the circumferential direction, the interlocking portion 600 and the second binding teeth 72 move in the axial direction of the screw member 510.

Additionally, in the present exemplary embodiment, in a case where the binding processing ends, the drive motor M is rotated reversely, the screw member 510 rotates in the reverse direction.

Accordingly, the interlocking portion 600 and the second binding teeth 72 move upward. In a case where the second binding teeth 72 move upward, the second binding teeth 72 retreat from the first binding teeth 71.

The moving mechanism 500 is provided with the drive motor M as an example of a drive source as illustrated in FIG. 5 in addition to the screw member 510.

Additionally, in the present exemplary embodiment, a drive gear (not illustrated) connected to an output shaft of the drive motor M and disposed coaxially with the output shaft is provided below the drive motor M. Additionally, a rotary gear (not illustrated) that meshes and rotates with the drive gear is provided. Moreover, in the present exemplary embodiment, as illustrated in FIG. 4, a larger-diameter gear 520 meshing with the rotary gear and receiving a driving force from the rotary gear is provided.

The larger-diameter gear 520 as an example of a rotating body is disposed coaxially with the screw member 510.

Additionally, in the present exemplary embodiment, a lower end part of the screw member 510 is fixed to the larger-diameter gear 520. Moreover, in the present exemplary embodiment, the outer diameter of the larger-diameter gear 520 is larger than the outer diameter of the screw member 510.

In the present exemplary embodiment, the larger-diameter gear 520 is rotated by the drive motor M, and accordingly, the screw member 510 rotates in the circumferential direction.

In the present exemplary embodiment, the larger-diameter gear 520 receives a driving force transmitted to the screw member 510. Then, the driving force is transmitted from the larger-diameter gear 520 to the screw member 510.

Accordingly, the screw member 510 rotates about an axis. In a case where the screw member 510 rotates about the axis, the second binding teeth 72 advance and retreat with respect to the first binding teeth 71.

A mechanism that moves the second binding teeth 72 is not particularly limited, and examples thereof include a cam mechanism and a jack mechanism. Here, in a case where the screw member 510 is used as in the present exemplary embodiment, the size of the second binding processing device 52 may be reduced.

Here, in a case where the cam mechanism or the jack mechanism is used, an aspect is conceivable in which the cam mechanism or the jack mechanism is provided, for example, at a point indicated by reference numeral 4Z in FIG. 4 (above the second binding processing device 52).

In this aspect, the interlocking portion 600 is pressed from above by the cam mechanism or the jack mechanism to move the second binding teeth 72.

Meanwhile, in this case, it is difficult to increase the separation amount between the first binding teeth 71 and the second binding teeth 72 while suppressing an increase in the size of the second binding processing device 52.

In addition, in the present exemplary embodiment, a space between the first binding teeth 71 and the second binding teeth 72 is a receiving portion that receives the paper bundle T. However, in a case where the cam mechanism or the jack mechanism is used, it is difficult to enlarge the receiving portion while suppressing an increase in the size of the second binding processing device 52.

In a case where the cam mechanism or the jack mechanism is used, the amount of advance and retreat of the second binding teeth 72 increases in a case where the cam mechanism or the jack mechanism is enlarged. Therefore, the receiving portion can be enlarged. However, in this case, the size of the second binding processing device 52 is increased.

Additionally, in a case where the receiving portion is made smaller, the increase in the size of the second binding processing device 52 can be suppressed, but in this case, the maximum number of sheets of the paper P that can be subjected to the binding processing is reduced.

In contrast, in a case where the screw member 510 is used as in the present exemplary embodiment, the increase in the size of the second binding processing device 52 is suppressed, and the receiving portion becomes larger.

Particularly, in the present exemplary embodiment, as illustrated in FIG. 5, some components of the moving mechanism 500 such as the drive motor M and the screw member 510 is configured to be provided on the side of the linear route 4Y where the second binding teeth 72 moves.

In this case, it is easy to secure the size of the receiving portion while reducing the dimension of the second binding processing device 52 in the height direction.

Additionally, in the present exemplary embodiment, as illustrated in FIG. 4, the larger-diameter gear 520 is disposed so as to extend in a direction intersecting the linear route 4Y in which the second binding teeth 72 move. This also reduces the dimension of the second binding processing device 52 in the height direction.

In the present exemplary embodiment, the direction in which the linear route 4Y extends and the radial direction of the larger-diameter gear 520 has an intersecting (orthogonal) relationship.

In this case, the dimension of the second binding processing device 52 in the height direction is smaller than that in a case where the larger-diameter gear 520 is installed in a direction in which the linear route 4Y extends.

Additionally, in the present exemplary embodiment, the second binding processing device 52 is configured to be capable of passing through the end guide 64 illustrated in FIG. 3.

More specifically, in the present exemplary embodiment, the maximum separation amount between the first binding teeth 71 and the second binding teeth 72 is larger than the height dimension of the end guide 64, and the end guide 64 passes through the above-described receiving portion. Accordingly, the second binding processing device 52 passes through the end guide 64.

As illustrated in FIG. 4, the interlocking portion 600 is provided with a load receiving member 620. In the present exemplary embodiment, the female thread portion 610 is provided in the load receiving member 620.

The load receiving member 620 as an example of a load receiving portion comes into contact with the screw member 510 and receives a load from the screw member 510.

Additionally, the interlocking portion 600 is provided with an upper support member 630 that supports the load receiving member 620 and the second binding teeth 72.

Additionally, the interlocking portion 600 is provided with two rod-shaped members 640 that are attached to the upper support member 630 and extend downward. Additionally, the interlocking portion 600 is provided with a fixing member 650 for fixing each of the rod-shaped members 640 to the upper support member 630.

In the present exemplary embodiment, a left rod-shaped member 640L located on the left side in the drawing and a right rod-shaped member 640R located on the right side in the drawing are provided as the rod-shaped members 640.

Each of the left rod-shaped member 640L and the right rod-shaped member 640R is disposed so as to extend along the linear route 4Y.

Each rod-shaped member 640 is used to guide the interlocking portion 600. Additionally, the rod-shaped member 640 is used to guide the second binding teeth 72.

In the present exemplary embodiment, the outer diameter of the rod-shaped member 640 is larger than the outer diameter of the screw member 510. More specifically, the outer diameters of the left rod-shaped member 640L and the right rod-shaped member 640R are larger than the outer diameter of the screw member 510.

Additionally, in the present exemplary embodiment, the upper support member 630 and the rod-shaped member 640 are separate parts, and the rod-shaped member 640 is attached to the upper support member 630.

In addition, not limited to this, the upper support member 630 and the rod-shaped member 640 may be integrated with each other such that the upper support member 630 has the function of the rod-shaped member 640.

The fixing member 650 is constituted by a nut 652.

A bolt portion 651 is provided at a distal end part of the rod-shaped member 640 located at the upper portion in the drawing, and the nut 652 is fixed to the bolt portion 651.

Additionally, in the present exemplary embodiment, a columnar rod-shaped member body 648 is provided in the portion of the rod-shaped member 640 located below the upper support member 630.

Additionally, in the present exemplary embodiment, the upper support member 630 is formed with a through-hole 633 (refer to FIG. 5) as an example of the hole portion.

In the present exemplary embodiment, the rod-shaped member 640 is passed through the through-hole 633. Additionally, in the present exemplary embodiment, as illustrated in FIG. 5, the bolt portion 651 of the rod-shaped member 640 protrudes upward from the upper support member 630.

In the present exemplary embodiment, as illustrated in FIG. 5, the nut 652 is attached to the bolt portion 651 that protrudes upward from the upper support member 630.

Additionally, in the present exemplary embodiment, the upper support member 630 is sandwiched between the nut 652 attached to the bolt portion 651 and the rod-shaped member body 648 of the rod-shaped member 640. Accordingly, the rod-shaped member 640 is fixed to the upper support member 630.

Additionally, in the present exemplary embodiment, as illustrated in FIG. 4, the second binding teeth 72 are fixed to the upper support member 630. More specifically, in the present exemplary embodiment, the second binding teeth 72 are fixed to one end part 631 of the upper support member 630 located on the near side in the drawing.

More specifically, in the present exemplary embodiment, the second binding teeth 72 are fixed to the upper support member 630 by press fitting. In addition, the fixing of the second binding teeth 72 is not limited to the press fitting, and may be performed by other methods such as adhesion, welding, and fastening.

Moreover, a lower support member 700 that supports the first binding teeth 71 is provided below the interlocking portion 600. In other words, the lower support member 700 that supports the first binding teeth 71 is provided below the upper support member 630.

In the present exemplary embodiment, the first binding teeth 71 are fixed to the lower support member 700 by press fitting. In addition, similar to the above, the fixing of the first binding teeth 71 is not limited to the press fitting, and may be performed by the other methods such as adhesion, welding, and fastening.

The lower support member 700 is provided with a teeth support portion 710 extending in the width direction of the second binding processing device 52 and supporting the first binding teeth 71 from below.

Moreover, the lower support member 700 is provided with a connection portion 720 that is connected to each of the end parts of the teeth support portion 710 and extends from the end part to the rear side of the second binding processing device 52.

In the present exemplary embodiment, the lower support member 700 is formed of a metal block, and the teeth support portion 710 and the connection portion 720 are integrated with each other.

Additionally, in the present exemplary embodiment, as illustrated in FIG. 5, a guide portion 90 that guides the second binding teeth 72 is provided.

The guide portion 90 is provided on the lower support member 700. Additionally, the guide portion 90 is disposed along the linear route 4Y in which the second binding teeth 72 move.

In the present exemplary embodiment, as described above, the rod-shaped member 640 is provided, and the guide portion 90 guides the rod-shaped member 640 to guide the second binding teeth 72.

More specifically, in the present exemplary embodiment, the lower support member 700 is provided with a hole portion 91 extending along the linear route 4Y.

The guide portion 90 of the present exemplary embodiment is constituted by an inner peripheral surface 91A of the hole portion 91.

In the present exemplary embodiment, the inner peripheral surface 91A of the hole portion 91 is used to guide the rod-shaped member 640 as an example of a guided portion.

In the present exemplary embodiment, a plurality of the guide portion 90 and a plurality of the rod-shaped member 640 which is the guided portion are provided. Specifically, in the present exemplary embodiment, two guide portions 90 and two rod-shaped members 640 are provided.

In addition, in the present exemplary embodiment, the two guided portions and the two guide portions are provided in this way, but the numbers of guided portions and guide portions installed are not limited to these and may be one or may be 3 or more.

The cross section of the hole portion 91 is formed in a circular shape. Additionally, in the present exemplary embodiment, the rod-shaped member 640 is constituted by, for example, a columnar member having a diameter of 00 mm or more.

In addition, the cross-sectional shape of the hole portion 91 and the cross-sectional shape of the rod-shaped member 640 are not limited to the circular shape but may be an elliptical shape, a polygonal shape, or the like. In the present exemplary embodiment, the columnar rod-shaped member 640 constituting a part of the interlocking portion 600 (refer to FIG. 4) enters the hole portion 91, and the rod-shaped member 640 is guided by the inner peripheral surface 91A of the hole portion 91.

In the present exemplary embodiment, the guide portion 90 is constituted by the hole portion 91 that is an example of a hole provided in the lower support member 700. More specifically, the guide portion 90 is constituted by an inner surface of the hole portion 91 provided in the lower support member 700.

The guide portion 90 guides an outer surface of the rod-shaped member 640, using the inner surface of the hole portion 91.

The rod-shaped member 640 (refer to FIG. 4) as an example of the guided portion and the rod-shaped portion extends in the upward-downward direction that is the movement direction of the interlocking portion 600. In other words, the rod-shaped member 640 extends along the movement route of the interlocking portion 600.

Additionally, the rod-shaped member 640 extends toward the downstream side in the movement direction of the interlocking portion 600 in a case where a connection point with the upper support member 630 is used as a starting point.

Additionally, in the present exemplary embodiment, the hole portion 91 (refer to FIG. 5) provided in the lower support member 700 to function as a guide portion also extends in the movement direction of the interlocking portion 600.

In addition, in FIGS. 4 and 5, the guide portion is constituted by the inner surface of the hole, and the guided portion is constituted by the rod-shaped portion that comes into contact with the inner surface of the hole. However, not limited to this, as will be described below, the guided portion may be constituted by the inner surface of the hole, and the guide portion may be constituted by the rod-shaped portion that comes into contact with the inner surface of the hole.

Additionally, the hole portion 91 (refer to FIG. 5) provided in the lower support member 700 may be provided in a state of penetrating the lower support member 700. Additionally, not limited to this, the hole portion 91 may be provided such that the hole portion 91 does not penetrate the lower support member 700 and has a bottom.

In the present exemplary embodiment, as the second binding teeth 72 moves toward the first binding teeth 71, the contact area between the guide portion 90 (refer to FIG. 5) and the rod-shaped member 640, which is the guided portion, increases.

More specifically, in the present exemplary embodiment, as the second binding teeth 72 moves toward the first binding teeth 71, the amount of the rod-shaped member 640 entering the hole portion 91 increases, and the contact area between the guide portion 90 and the rod-shaped member 640 increases.

In other words, in the present exemplary embodiment, as the second binding teeth 72 move toward the first binding teeth 71, the area of a region where the guide portion 90 and the rod-shaped member 640 overlap each other increases.

Figure 6:
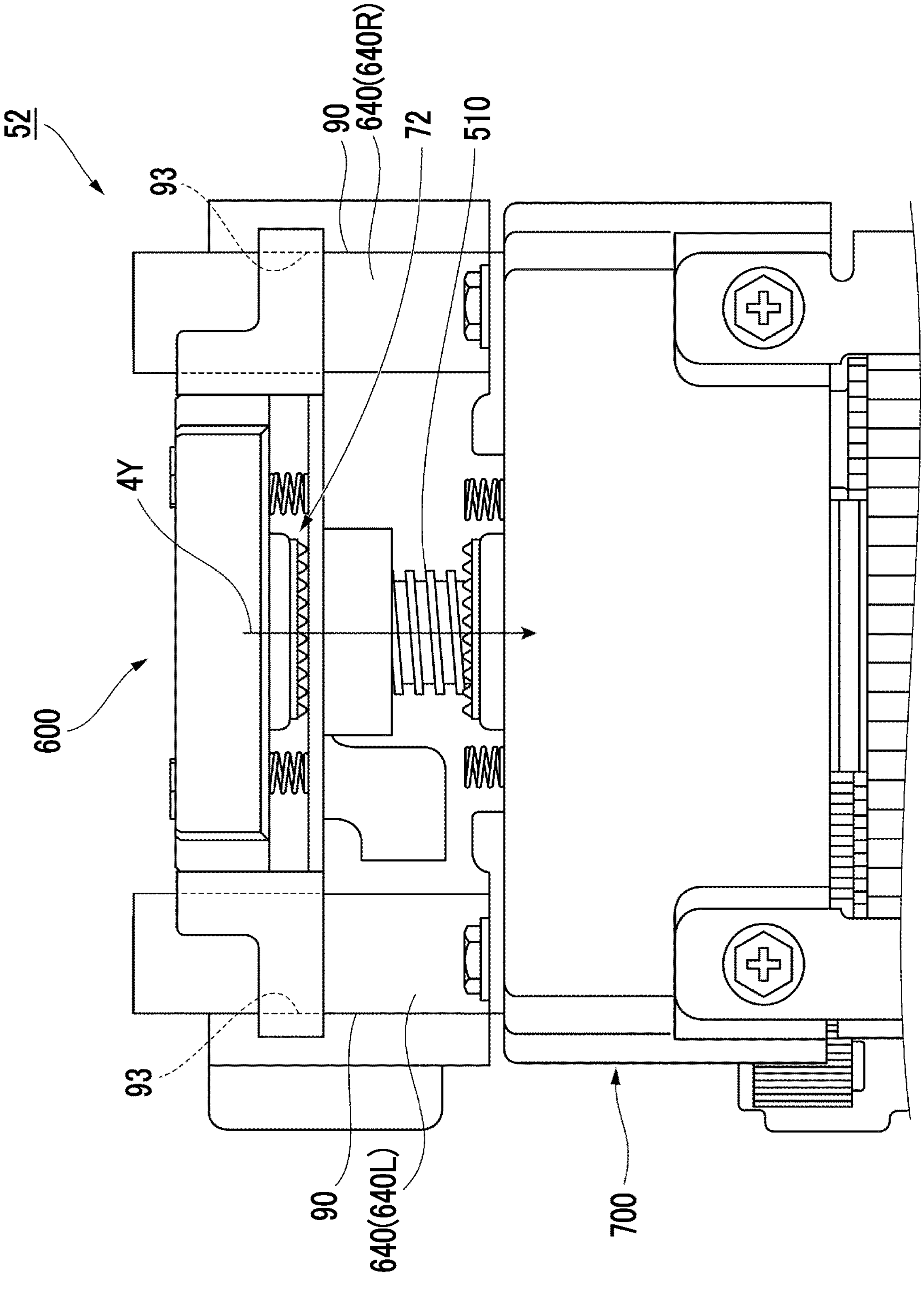
FIG. 6 is a diagram illustrating another configuration example of the second binding processing device.

FIG. 6 is a diagram illustrating another configuration example of the second binding processing device 52.

A case where the guided portion is constituted by the inner surface of the hole and the guide portion is constituted by the rod-shaped portion that comes into contact with the inner surface of the hole is exemplified in FIG. 6.

In this configuration example, a hole portion 93 extending along the linear route 4Y is provided on the interlocking portion 600 side interlocking with the second binding teeth 72.

Additionally, in this configuration example, the rod-shaped member 640 that enters the hole portion 93 and extends along the linear route 4Y is provided on the lower support member 700 side. The rod-shaped member 640 is fixed to the lower support member 700.

In this configuration example, an outer peripheral surface of the rod-shaped member 640 serves as the guide portion 90, and the outer peripheral surface is used to guide the interlocking portion 600.

In this configuration example, the guided portion is constituted by the inner surface of the hole portion 93 extending in the movement direction of the interlocking portion 600. Additionally, in this configuration example, the guide portion is constituted by the rod-shaped member 640 that comes into contact with the inner surface of the hole portion 93 extending in the movement direction of the interlocking portion 600.

Additionally, in the present exemplary embodiment (in the exemplary embodiments illustrated in FIGS. 4 and 5), the screw member 510 is movable with respect to the interlocking portion 600, and the screw member 510 is movable in a direction intersecting (orthogonal to) the direction in which the screw member 510 extends.

Specifically, in the present exemplary embodiment, the screw member 510 is movable with respect to the interlocking portion 600, that is, the screw member 510 in the direction indicated by the arrow 4A in FIG. 4 is movable.

In other words, the screw member 510 is movable in the width direction of the second binding processing device 52.

In the present exemplary embodiment, the load receiving member 620 is movable in the direction indicated by the arrow 4A.

More specifically, in the present exemplary embodiment, the load receiving member 620 is configured to be relatively movable with respect to the upper support member 630, and thereby, the load receiving member 620 in the width direction of the second binding processing device 52 is movable.

In other words, in the present exemplary embodiment, the load receiving member 620 is configured to be movable with respect to the upper support member 630 and the rod-shaped member 640 that constitute a part of the interlocking portion 600.

In this way, in a case where the load receiving member 620 is movable with respect to the upper support member 630 and the rod-shaped member 640, the screw member 510 is movable with respect to the upper support member 630 and the rod-shaped member 640.

More specifically, the screw member 510 is movable with respect to the upper support member 630 and the rod-shaped member 640, and the screw member 510 is movable in the direction intersecting (orthogonal to) the direction in which the screw member 510 extends. In other words, the screw member 510 is movable in the radial direction of the screw member 510.

Figure 7:
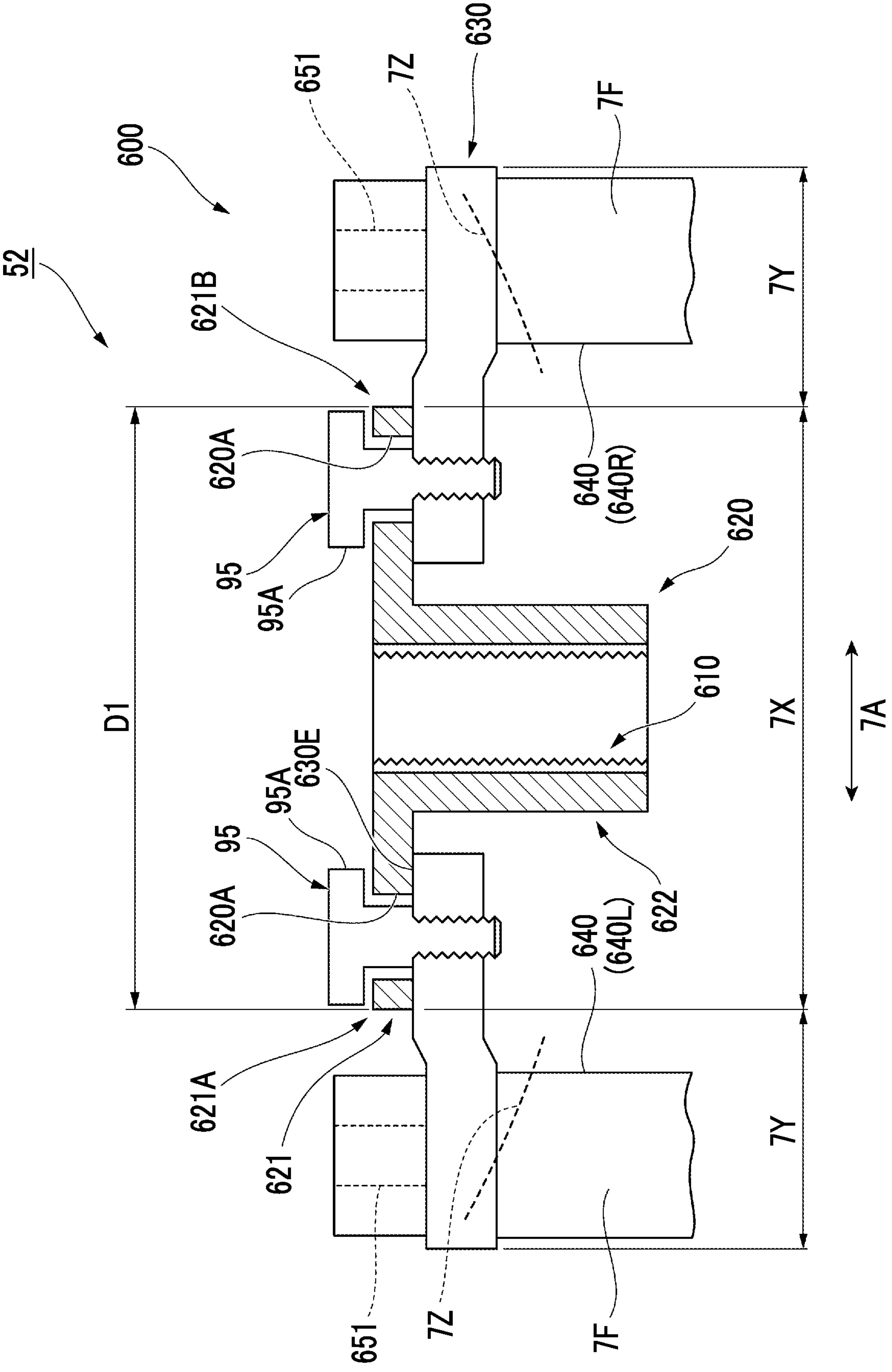
FIG. 7 is a cross-sectional view of the second binding processing device taken along line VII-VII in FIG. 4, and is a cross-sectional view illustrating an upper portion of the second binding processing device 52.

FIG. 7 is a cross-sectional view of the second binding processing device 52 taken along line VII-VII in FIG. 4, and is a cross-sectional view illustrating an upper portion of the second binding processing device 52.

In the present exemplary embodiment, as illustrated in FIG. 7, a through-hole 620A is formed in the load receiving member 620, and a fixing screw 95 used for fixing the load receiving member 620 to the upper support member 630 is passed through the through-hole 620A.

A gap is formed between an inner peripheral surface of the through-hole 620A and the fixing screw 95. Additionally, no thread portion is provided on an outer peripheral surface of the portion of the fixing screw 95 located within the through-hole 620A.

Additionally, the thickness of the load receiving member 620 is smaller than the separation distance between a head portion 95A of the fixing screw 95 and an upper surface 630E of the upper support member 630.

Accordingly, in the present exemplary embodiment, the load receiving member 620 is movable with respect to the upper support member 630, that is, the load receiving member 620 is movable in the direction indicated by arrow 7A in the drawing.

In this case, the screw member 510 (not illustrated in FIG. 7) is movable with respect to the upper support member 630 and the rod-shaped member 640. In other words, the screw member 510 is movable with respect to the interlocking portion 600 (refer to FIG. 4), and the screw member 510 is movable in the direction intersecting the direction in which the screw member 510 extends.

Here, for example, a configuration in which the screw member 510 cannot be moved with respect to the interlocking portion 600, and for example, a state in which the screw member 510 is inclined with respect to the linear route 4Y (refer to FIG. 4) is assumed.

In this case, in a case where the second binding teeth 72 advance to the first binding teeth 71, the second binding teeth 72 move to a position different from the original position thereof. In this case, the position of the second binding teeth 72 with respect to the first binding teeth 71 deviate from an originally predetermined position.

In contrast, in a case where the screw member 510 is movable as in the present exemplary embodiment, the inclination of the screw member 510 with respect to the linear route 4Y becomes smaller, and the deviation of the second binding teeth 72 with respect to the first binding teeth 71 becomes smaller.

Additionally, in a case where the screw member 510 cannot be moved with respect to the interlocking portion 600 and the screw member 510 is inclined with respect to the linear route 4Y, a situation may occur in which, while the second binding teeth 72 faces the first binding teeth 71, the second binding teeth 72 stop and the binding cannot be performed.

In contrast, in a case where the screw member 510 is movable as in the present exemplary embodiment, the inclination of the screw member 510 with respect to the linear route 4Y becomes smaller. As a result, problems such that the second binding teeth 72 stops halfway are less likely to occur.

In the present exemplary embodiment, the portion indicated by reference numeral 7F in FIG. 7 is a guided portion guided by the guide portion 90 (refer to FIG. 5), and in the present exemplary embodiment, the load receiving member 620 is movable with respect to the guided portion.

More specifically, the load receiving member 620 is movable with respect to the guided portion in a direction intersecting (orthogonal) the axial direction of the screw member 510 (not illustrated in FIG. 7).

The interlocking portion 600 is configured to include the load receiving member 620 as an example of a load receiving portion that comes into contact with the screw member 510 and receives a load from the screw member 510, and the rod-shaped member 640 as an example of the guided portion guided by the guide portion 90.

In the present exemplary embodiment, the load receiving member 620 as an example of the load receiving portion is movable with respect to the rod-shaped member 640.

In a case where the load receiving member 620 is movable with respect to the rod-shaped member 640 as in the present exemplary embodiment, the deviation of the second binding teeth 72 with respect to the first binding teeth 71 becomes smaller as described above. As a result, problems such that the second binding teeth 72 stops halfway are less likely to occur.

As illustrated in FIG. 7, the load receiving member 620 has a T-shaped cross-sectional shape.

More specifically, the load receiving member 620 includes a disk-shaped larger-diameter portion 621 located at the upper portion in the drawing, and a smaller-diameter portion 622 located below the larger-diameter portion 621.

The larger-diameter portion 621 and the smaller-diameter portion 622 are disposed coaxially with each other. Additionally, a lower end part of the larger-diameter portion 621 and an upper end part of the smaller-diameter portion 622 are connected to each other.

A female thread portion 610 is provided on the central axis of the load receiving member 620.

The female thread portion 610 has a tubular shape, and in the present exemplary embodiment, the rod-shaped screw member 510 (refer to FIG. 4) is passed through the female thread portion 610. In other words, in the present exemplary embodiment, the female thread portion 610 and the screw member 510 mesh with each other and are connected to each other.

Additionally, in the present exemplary embodiment, a length L1 (refer to FIG. 5) of the second binding teeth 72 in the longitudinal direction is smaller than an outer diameter Dl (refer to FIG. 7) of the larger-diameter portion 621.

Additionally, in the present exemplary embodiment, in a case where the position of the larger-diameter portion 621 in the radial direction is compared, the second binding teeth 72 (refer to FIG. 7) are located closer to the other end 621B than the one end 621A (refer to FIG. 5) of the larger-diameter portion 621. Additionally, the second binding teeth 72 are located closer to the one end 621A than the other end 621B of the larger-diameter portion 621.

In other words, in the present exemplary embodiment, in a case where the second binding processing device 52 is viewed from the front (in a case where the second binding processing device 52 is viewed from the side where the receiving portion is provided), the second binding teeth 72 is located between the one end 621A and the other end 621B of the larger-diameter portion 621.

In the present exemplary embodiment, the load receiving member 620 is pulled downward by the screw member 510, and accordingly, a portion of the upper support member 630 indicated by reference numeral 7X in FIG. 7 is uniformly pressed from above by the load receiving member 620.

In this case, the portion of the upper support member 630 that is uniformly pressed is likely to move downward while substantially maintaining a shape that extends laterally and linearly.

On the other hand, side portions (portions indicated by reference numeral 7Y in FIG. 7) of the upper support member 630 located on both sides of the pressed portion are likely to be inclined with respect to the horizontal direction as indicated by reference numeral 7Z.

In this case, for example, in a case where the dimension of the second binding teeth 72 in the longitudinal direction is large and some of the second binding teeth 72 reach the above side portions (portions indicated by reference numeral 7Y), the second binding teeth 72 are easily distorted.

In contrast, as in the present exemplary embodiment, in a case where the second binding teeth 72 do not reach the side portions, and the second binding teeth 72 is fitted between the one end 621A and the other end 621B of the larger-diameter portion 621, the second binding teeth 72 are less likely to be distorted.

Additionally, in the present exemplary embodiment, the second binding teeth 72 is movable with respect to the guide portion 90 (refer to FIG. 5), and the second binding teeth 72 is movable in a direction intersecting the direction in which the guide portion 90 extends.

More specifically, in the present exemplary embodiment, the second binding teeth 72 is movable in the direction intersecting the direction indicated by arrow 5X (refer to FIG. 5), which is the direction in which the inner peripheral surface 91A of the hole portion 91 extends.

In addition, in the present exemplary embodiment, the second binding teeth 72 are movable in a direction intersecting the direction in which the second binding teeth 72 advance and retreat.

Additionally, in the present exemplary embodiment, the upper support member 630 is movable in the direction indicated by arrow 5Y in FIG. 5.

More specifically, in the present exemplary embodiment, the upper support member 630 is movable with respect to the rod-shaped member 640, and the upper support member 630 is movable in the direction indicated by the arrow 5Y. In other words, in the present exemplary embodiment, the upper support member 630 is movable in the longitudinal direction of the second binding teeth 72.

In the present exemplary embodiment, the second binding teeth 72 are moved in the longitudinal direction by moving the upper support member 630 with respect to the rod-shaped member 640.

In addition, in the present exemplary embodiment, in a case where the upper support member 630 is moved with respect to the rod-shaped member 640, the second binding teeth 72 are moved in the direction intersecting the direction in which the guide portion 90 extends (the direction indicated by the arrow 5X in the drawing).

More specifically, in the present exemplary embodiment, as illustrated in FIG. 5, the bolt portion 651 is provided at the upper end part of the rod-shaped member 640.

Moreover, in the present exemplary embodiment, a through-hole 633 through which the bolt portion 651 is passed is formed in the upper support member 630. The through-hole 633 is a so-called elongated hole, and is formed so as to extend in the longitudinal direction of the second binding teeth 72.

Accordingly, in the present exemplary embodiment, the upper support member 630 is movable with respect to the rod-shaped member 640, and the second binding teeth 72 are movable in the direction intersecting the direction in which the rod-shaped member 640 extends. In other words, the second binding teeth 72 are movable in the direction intersecting the direction in which the guide portion 90 extends.

More specifically, the second binding teeth 72 are movable in the direction indicated by the arrow 5Y in FIG. 5.

In the present exemplary embodiment, after the fixing of the rod-shaped member 640 to the upper support member 630 by the bolt portion 651 and the nut 652 is released, the upper support member 630 is moved in the longitudinal direction of the second binding teeth 72.

Accordingly, a positional relationship between the first binding teeth 71 and the second binding teeth 72 is changed. In addition, the relative position of the second binding teeth 72 with respect to the first binding teeth 71 is adjusted.

In addition, in the present exemplary embodiment, in a case where the adjustment of the position of the second binding teeth 72 ends, the nut 652 is tightened to the bolt portion 651, and the rod-shaped member 640 is fixed to the upper support member 630 again.

In addition, in the present exemplary embodiment, the configuration in which the upper support member 630 moves in the longitudinal direction of the second binding teeth 72 has been described. However, the present invention is not limited to the configuration, and the upper support member 630 may be moved in both of the longitudinal direction of the second binding teeth 72 and the direction orthogonal to the longitudinal direction.

In addition, in order to allow the upper support member 630 to move in both directions of the longitudinal direction and the orthogonal direction, for example, the above-described through-hole 633 formed in the upper support member 630 is formed of, for example, a round hole having a diameter larger than the outer diameter of the bolt portion 651.

Accordingly, the upper support member 630 moves in both directions of the longitudinal direction and the orthogonal direction.

Moreover, in the present exemplary embodiment, as illustrated in FIG. 5, the drive motor M is fitted between the one end 511 and the other end 512 of the screw member 510 in the axial direction. In other words, in the present exemplary embodiment, the drive motor M is located beside the screw member 510.

Accordingly, in the present exemplary embodiment, the size of the second binding processing device 52 in the direction in which the screw member 510 extends, in other words, in the direction in which the second binding teeth 72 advance and retreat, is reduced.

Here, in a case where the drive motor M is located, for example, at a point indicated by reference numeral 5S in FIG. 5, the second binding processing device 52 is likely to be increased in size.

In contrast, as in the present exemplary embodiment, in a case where the drive motor M is located beside the screw member 510, the increase in the size of the second binding processing device 52 is suppressed.

In the present exemplary embodiment, all or most of the drive motor M is fitted between the one end 511 and the other end 512 of the screw member 510 in the axial direction.

In addition, not limited to this, at least a part of the drive motor M may be located closer to the other end 512 side than the one end 511 of the screw member 510 in the axial direction and closer to the one end 511 side than the other end 512.

In this case, the size of the second binding processing device 52 may be reduced as compared to a configuration in which the drive motor M is not located at all between the one end 511 and the other end 512.

Figure 8:
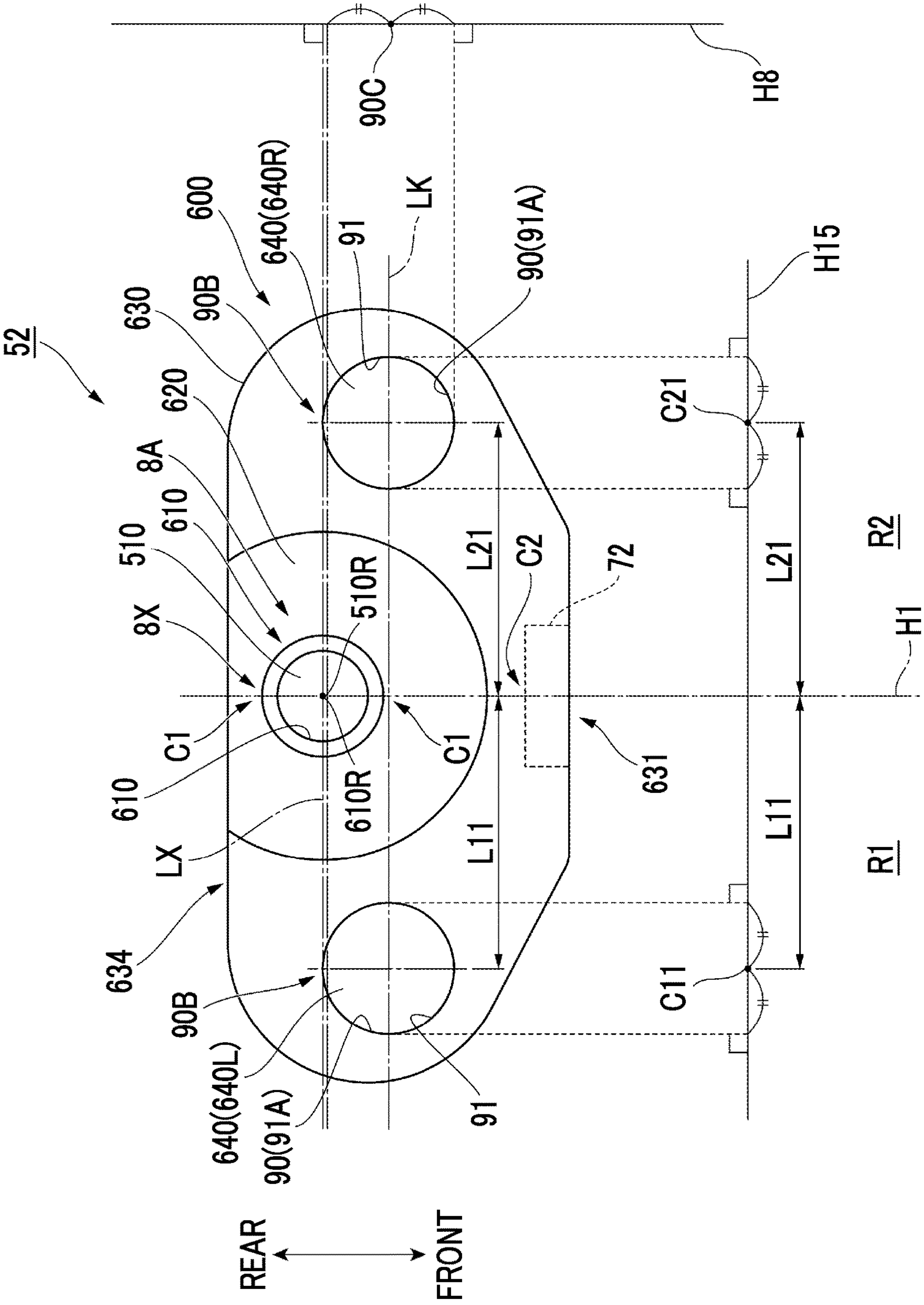
FIG. 8 is a diagram illustrating a cross section of the second binding processing device taken along line VIII-VIII in FIG. 5.

FIG. 8 is a diagram illustrating a cross section of the second binding processing device 52 taken along line VIII-VIII in FIG. 5.

The moving mechanism 500 (refer to FIG. 4) of the present exemplary embodiment applies a load to a specific point of the interlocking portion 600 to move the second binding teeth 72 toward the first binding teeth 71.

More specifically, the moving mechanism 500 applies a load to a specific point (hereinafter, referred to as "load application point 8A") in the present exemplary embodiment, which is indicated by reference numeral 8A (refer to FIG. 8), in the interlocking portion 600 to move the second binding teeth 72 toward the first binding teeth 71.

More specifically, in the present exemplary embodiment, the load application point 8A is a point where the female thread portion 610 is provided, and in the present exemplary embodiment, the interlocking portion 600 is moved to move the second binding teeth 72 toward the first binding teeth 71 by applying a load to the point where the female thread portion 610 is provided.

In the present exemplary embodiment, the guide portion 90 (the inner peripheral surface 91A of the hole portion 91) is located closer to the second binding teeth 72 side than the load application point 8A.

In addition, being located closer to does not mean that all portions of the guide portion 90 are located closer to the second binding teeth 72 side than the load application point 8A.

In the present exemplary embodiment, a rear portion 90B of the guide portion 90 located closest to the rear side is located closer to the second binding teeth 72 side than a rear portion 8X of the load application point 8A located closest to the rear side.

In this way, in a case where portions located closest to the rear side are compared with each other and in a case where the rear portion 90B of the guide portion 90 is located closer to the second binding teeth 72 side than the rear portion 8X of the load application point 8A, it can be said that the guide portion 90 is located closer to the second binding teeth 72 side than the load application point 8A.

The guide portion 90 guides a portion of the interlocking portion 600 interlocking with the second binding teeth 72, which is located closer to the second binding teeth 72 side than the load application point 8A, to guide the second binding teeth 72.

More specifically, the guide portion 90 guides the rod-shaped member 640 located closer to the second binding teeth 72 side than the load application point 8A to guide the second binding teeth 72.

Additionally, in the present exemplary embodiment, assuming a virtual plane H1 passing through the load application point 8A and the second binding teeth 72 and extending along the linear route 4Y (refer to FIG. 5), the guide portion 90 is provided in each of two regions R1 and R2 facing each other with the plane H1 interposed therebetween.

More specifically, in the present exemplary embodiment, assuming the virtual plane H1 passing through a center portion C1 of the load application point 8A and a central portion C2 of the second binding teeth 72 in the longitudinal direction and extending along the linear route 4Y, the guide portion 90 is provided in each of two regions R1 and R2 facing each other with the plane H1 interposed therebetween.

In other words, in the present exemplary embodiment, assuming the virtual plane H1 passing through an axis center 510R of the screw member 510 and the central portion C2 in the longitudinal direction of the second binding teeth 72 and extending along the linear route 4Y, the guide portion 90 is provided in each of two regions R1 and R2 facing each other with the plane H1 interposed therebetween.

Moreover, in the present exemplary embodiment, each guide portion 90 provided in each of the two regions R1 and R2 is disposed closer to the second binding teeth 72 side than the load application point 8A.

In the present exemplary embodiment, in a case where the second binding teeth 72 are pushed against the paper bundle T, the second binding teeth 72 are pressed upward by a reaction, and the one end part 631 side of the upper support member 630 moves upward.

In this case, in a case where each of the guide portions 90 is located closer to the second binding teeth 72 side than the load application point 8A as in the present exemplary embodiment, the upward movement of the one end part 631 of the upper support member 630 is less likely to occur.

Additionally, in the present exemplary embodiment, assuming a virtual line LX passing through an axis center 610R of the female thread portion 610 and extending in the longitudinal direction of the second binding teeth 72, the guide portion 90 is located at a point deviated from the virtual line LX.

More specifically, the guide portion 90 is located closer to the second binding teeth 72 side than the virtual line LX.

FIG. 8 illustrates a cross-sectional view in a case where the second binding processing device 52 is viewed from above. However, in a state where the second binding processing device 52 is viewed from above, the guide portion 90 is located closer to the second binding teeth 72 side than the virtual line LX.

The expression "the guide portion 90 is located closer to the second binding teeth 72 side than the virtual line LX" means that the central portion 90C of the guide portion 90 in a case where the guide portion 90 is projected onto a plane H8 is located closer to the second binding teeth 72 side than in a case where the virtual line LX is projected onto the plane H8.

Here, the plane H8 is a plane having a relationship orthogonal to the longitudinal direction of the second binding teeth 72. In the present exemplary embodiment, the central portion 90C of the guide portion 90 (a central portion in a direction in which the plane H8 extends) is located closer to the second binding teeth 72 side than the virtual line LX in a case where the guide portion 90 and the virtual line LX are projected on the plane H8 (projected in a direction orthogonal to the plane H8).

The expression "the guide portion 90 is located closer to the second binding teeth 72 side than the virtual line LX" is not limited to a state where all portions of the guide portion 90 are located closer to the second binding teeth 72 side than the virtual line LX.

As described above, in a case where the central portion 90C of the guide portion 90 is located closer to the second binding teeth 72 side than the virtual line LX, it can be said that the guide portion 90 is located closer to the second binding teeth 72 side than the virtual line LX.

In this case, the upward movement of the one end part 631 of the upper support member 630 is less likely to occur than in a case where the guide portion 90 is located on the virtual line LX.

In other words, as compared to a case where the position of the virtual line LX and the position of the central portion 90C of the guide portion 90 are aligned with each other, the upward movement of the one end part 631 of the upper support member 630 is less likely to occur.

In this case, in a case where the binding processing is performed, the second binding teeth 72 do not easily escape upward, and a larger load acts on the paper bundle T.

Additionally, in the present exemplary embodiment, the guide portion 90 provided in each of the two regions R1 and R2 is disposed on a common straight line LK extending in the longitudinal direction of the second binding teeth 72.

In addition, the guide portion 90 provided in each of the two regions R1 and R2 is disposed on the straight line LK line extending in the longitudinal direction of the second binding teeth 72 and passing through a point other than the axis center 610R of the female thread portion 610.

The expression "the guide portion 90 is disposed on the straight line LK" refers to that the position of the central portion 90C (the central portion in the direction in which the plane H8 extends) of the guide portion 90 and the position of the straight line LK coincide with each other in a case where the guide portion 90 and the straight line LK are projected onto the plane H8 (projected in a direction orthogonal to the plane H8).

Moreover, in the present exemplary embodiment, a distance L11 between the guide portion 90 provided in one region R1 of the two regions R1 and R2 and the plane H1 and a distance L21 between the guide portion 90 provided in the other region R2 and the plane H1 are equal to each other.

In addition, in the present exemplary embodiment, the distance L11 between one guide portion 90 of the two guide portions 90 disposed on the common straight line LK and the plane H1, and the distance L21 between the other guide portion 90 and the plane H1 are equal to each other.

More specifically, in a case where the plane H1, one guide portion 90, and the other guide portion 90 are projected onto the plane H15 extending in the longitudinal direction of the second binding teeth 72 (projected in a direction orthogonal to the plane H15) is assumed.

In this case, in the present exemplary embodiment, a distance L11 between a central portion C11 of the one guide portion 90 (a central portion in a direction in which the plane H15 extends) and the plane H1 and a distance L21 between a central portion C21 of the other guide portion 90 (a central portion in a direction which the plane H15 extends) and the plane H1 are equal to each other.

Additionally, in the present exemplary embodiment, the female thread portion 610 of the interlocking portion 600, which is a contact portion coming into contact with the screw member 510, is located closer to the right rod-shaped member 640R side on the right side in the drawing, which is an example of a second guided portion, than the left rod-shaped member 640L on the left side in the drawing, which is an example of a first guided portion.

Additionally, the female thread portion 610 is located closer to the left rod-shaped member 640L side on the left side in the drawing than the right rod-shaped member 640R on the right side in the drawing.

In the present exemplary embodiment, the interlocking portion 600 is provided with the left rod-shaped member 640L and the right rod-shaped member 640R, which are guided by the guide portion 90.

Also, in the present exemplary embodiment, the female thread portion 610, which is an example of the contact portion, is located closer to the right rod-shaped member 640R side than the left rod-shaped member 640L and closer to the left rod-shaped member 640L side than the right rod-shaped member 640R.

In the present exemplary embodiment, the female thread portion 610 can be regarded as the load receiving portion that receives a load from the screw member 510. In the present exemplary embodiment, the load receiving portion is located closer to the right rod-shaped member 640R side than the left rod-shaped member 640L and is located closer to the left rod-shaped member 640L side than the right rod-shaped member 640R.

More specifically, a case where the left rod-shaped member 640L, the right rod-shaped member 640R, and the female thread portion 610 are projected onto the plane H15 is assumed.

In this case, on the plane H15, the female thread portion 610 is located closer to the right rod-shaped member 640R side than the left rod-shaped member 640L and is located closer to the left rod-shaped member 640L side than the right rod-shaped member 640R.

In the present exemplary embodiment, the second binding teeth 72 move toward the first binding teeth 71 by applying a load to the load receiving member 620 of the interlocking portion 600 (refer to FIG. 8).

More specifically, as a load is applied to the female thread portion 610 provided on the load receiving member 620, the second binding teeth 72 move toward the first binding teeth 71.

In the present exemplary embodiment, it can be said that the first binding teeth 71 and the second binding teeth 72 are also located closer to the right rod-shaped member 640R side than the left rod-shaped member 640L and located closer to the left rod-shaped member 640L side than the right rod-shaped member 640R.

Figure 9:
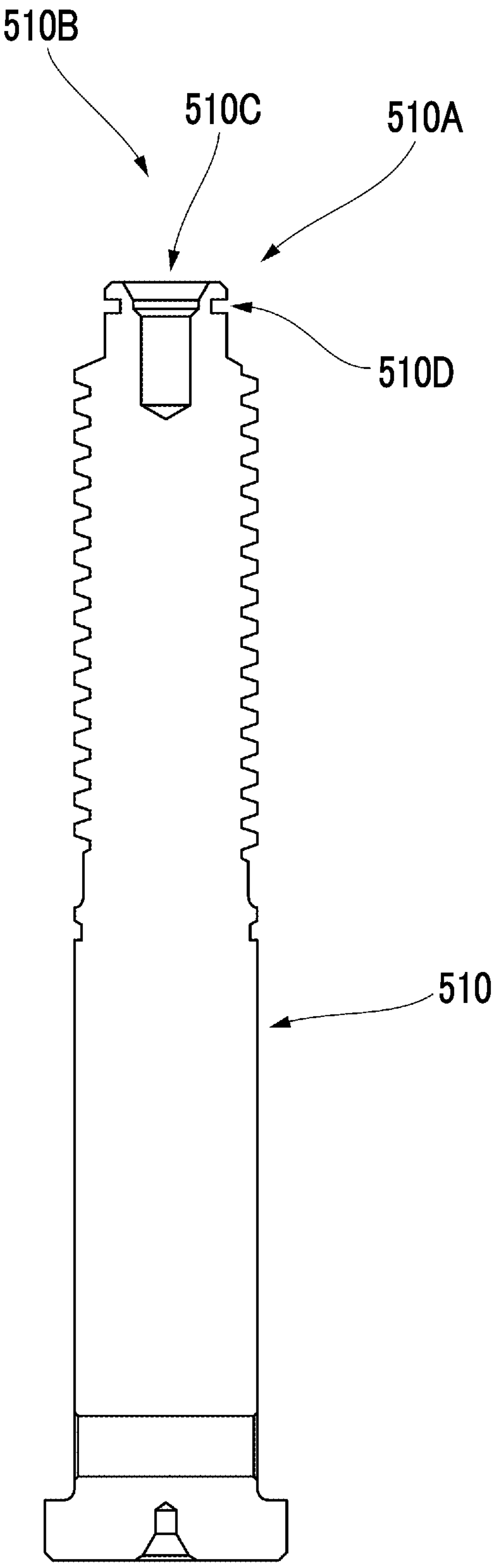
FIG. 9 is a vertical cross-sectional view of a screw member.

FIG. 9 is a vertical cross-sectional view of the screw member 510.

In the present exemplary embodiment, a restricting member that restricts the movement of the interlocking portion 600 (refer to FIG. 4) is attached to the screw member 510.

Specifically, an attached portion 510B is provided at one end part 510A of the screw member 510. The restricting member can be attached to the attached portion 510B.

Specifically, an end surface located at the one end part 510A of the screw member 510 is provided with a concave portion 510C having a circular cross section, which is recessed toward the inner side of the screw member 510. A female thread is formed on an inner surface of the concave portion 510C. In the present exemplary embodiment, a restricting member 980 (refer to FIG. 4) including a male screw is attached to the female thread portion.

In the present exemplary embodiment, in a case where the screw member 510 rotates more than necessary and the interlocking portion 600 reaches the one end part 510A (refer to FIG. 9) of the screw member 510, the interlocking portion 600 bumps against the restricting member 980 to restrict the movement of the interlocking portion 600.

Accordingly, a situation in which the interlocking portion 600 is separated from the screw member 510 is suppressed.

Additionally, in the present exemplary embodiment, a groove 510D extending in the circumferential direction of the screw member 510 is formed on the one end part 510A and the outer peripheral surface of the screw member 510.

In the present exemplary embodiment, a retainer (not illustrated) having, for example, an E-shaped or C-shaped cross section can be mounted on the groove 510D. In the present exemplary embodiment, the movement of the interlocking portion 600 can be restricted even by this retainer.

Figure 10:
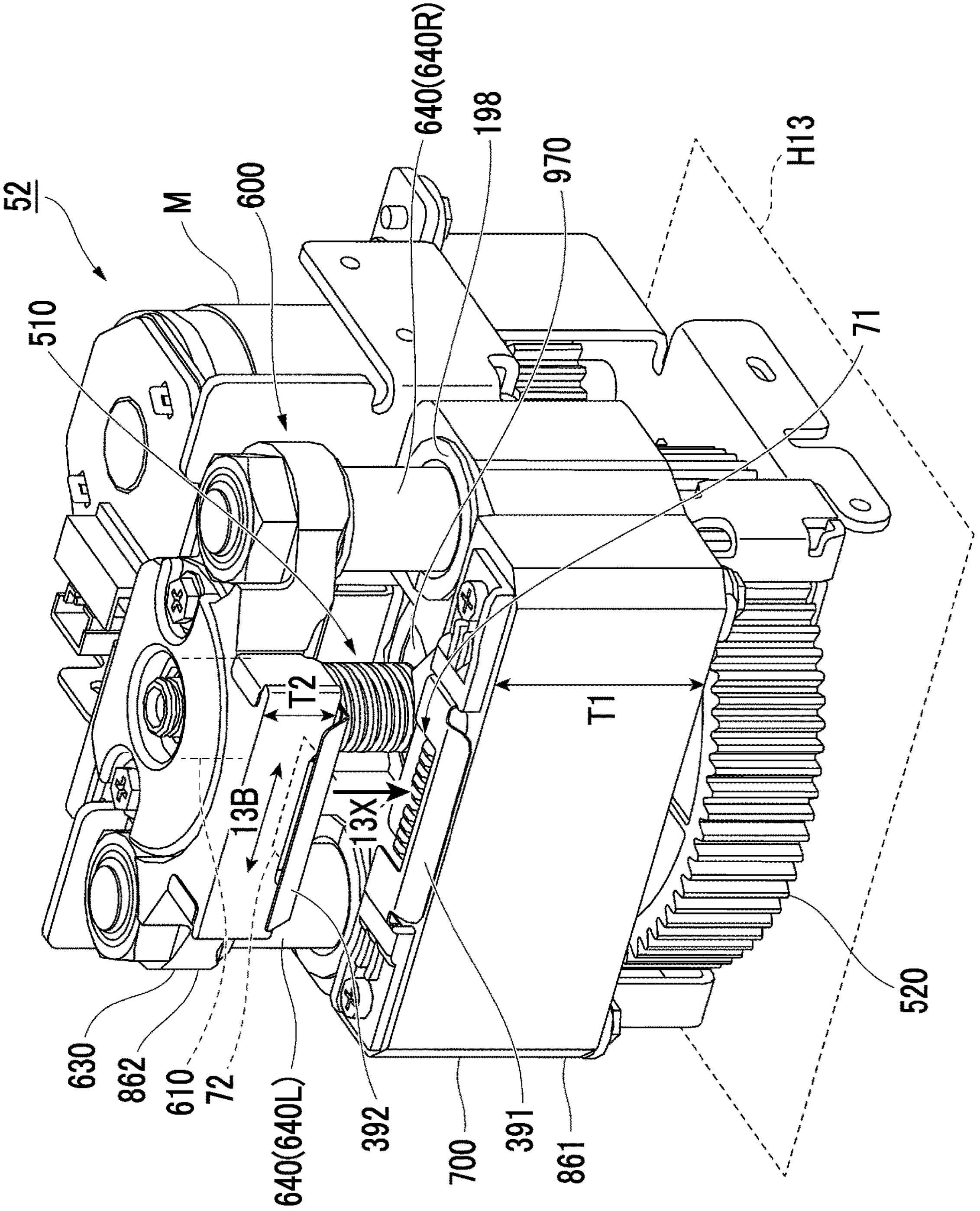
FIG. 10 is a perspective view illustrating another configuration example of the second binding processing device.

FIG. 10 is a perspective view illustrating another configuration example of the second binding processing device 52.

In addition, the components of the second binding processing device 52 illustrated in FIG. 10 are the same as the components of the second binding processing device 52 described above.

In this configuration example illustrated in FIG. 10, the positional relationship between the left rod-shaped member 640L, the right rod-shaped member 640R, the screw member 510, and the female thread portion 610 is different from the above.

Specifically, in this configuration example illustrated in FIG. 10, the screw member 510 and the female thread portion 610, which is an example of the load receiving portion, are provided between the left rod-shaped member 640L that is the first guided portion and the right rod-shaped member 640R that is the second guided portion.

More specifically, in this configuration example, in a case where the left rod-shaped member 640L, the right rod-shaped member 640R, the screw member 510, and the female thread portion 610 are projected toward the upstream side or the downstream side in the movement direction of the second binding teeth 72, the screw member 510 and the female thread portion 610 are located between the left rod-shaped member 640L and the right rod-shaped member 640R.

More specifically, a case where the left rod-shaped member 640L, the right rod-shaped member 640R, the screw member 510, and the female thread portion 610 are projected toward the upstream side or the downstream side in the movement direction of the second binding teeth 72 and toward the virtual plane H13 having a relationship orthogonal to the movement direction of the second binding teeth 72 is assumed.

In this case, the screw member 510 and the female thread portion 610 are located between the left rod-shaped member 640L and the right rod-shaped member 640R on the virtual plane H13.

Here, the expression "the screw member 510 and the female thread portion 610 are located between the left rod-shaped member 640L and the right rod-shaped member 640R" includes not only a state in which all portions of the female thread portion 610 and all portions of the screw member 510 are located between the left rod-shaped member 640L and the right rod-shaped member 640R, but also a state in which a part of the female thread portion 610 and a part of the screw member 510 are located therebetween.

In addition, the present exemplary embodiment has a configuration in which all parts of the screw member 510 and all parts of the female thread portion 610 are located between the left rod-shaped member 640L and the right rod-shaped member 640R.

Additionally, in this configuration example, in a case where the left rod-shaped member 640L, the right rod-shaped member 640R, the first binding teeth 71, and the second binding teeth 72 are projected toward the upstream side or the downstream side in the movement direction of the second binding teeth 72, the first binding teeth 71 and the second binding teeth 72 are located at points out of between the left rod-shaped member 640L and the right rod-shaped member 640R.

In the present exemplary embodiment, two guided portions including the left rod-shaped member 640L and the right rod-shaped member 640R, are provided as the guided portions, but in this configuration example, the first binding teeth 71 and the second binding teeth 72 are located at points out of between the two guided portions.

More specifically, a case where the left rod-shaped member 640L, the right rod-shaped member 640R, the first binding teeth 71, and the second binding teeth 72 are projected toward the upstream side or the downstream side in the movement direction of the second binding teeth 72 and toward the above virtual plane H13 having a relationship orthogonal to the movement direction of the second binding teeth 72 is assumed.

In this case, the first binding teeth 71 and the second binding teeth 72 are located at points deviated from between the left rod-shaped member 640L and the right rod-shaped member 640R on the virtual plane H13.

Moreover, a case where the left rod-shaped member 640L, the right rod-shaped member 640R, the first binding teeth 71, and the second binding teeth 72 are projected toward the upstream side or the downstream side in the movement direction of the second binding teeth 72 is assumed.

In this case, the first binding teeth 71 and the second binding teeth 72 are located closer to the right rod-shaped member 640R side than the left rod-shaped member 640L and located closer to the left rod-shaped member 640L side than the right rod-shaped member 640R.

In other words, on the above virtual plane H13, the first binding teeth 71 and the second binding teeth 72 are located closer to the right rod-shaped member 640R side than the left rod-shaped member 640L and located closer to the left rod-shaped member 640L side than the right rod-shaped member 640R.

Additionally, a case where the left rod-shaped member 640L, the right rod-shaped member 640R, the first binding teeth 71, the second binding teeth 72, and the female thread portion 610 are projected toward the upstream side or the downstream side in the movement direction of the second binding teeth 72 is assumed.

In this case, in the present exemplary embodiment, the female thread portion 610 is located closer to the side where the left rod-shaped member 640L and the right rod-shaped member 640R are provided, than the first binding teeth 71 and the second binding teeth 72.

In other words, on the virtual plane H13, the female thread portion 610 is located closer to the side where the left rod-shaped member 640L and the right rod-shaped member 640R are provided, than the first binding teeth 71 and the second binding teeth 72.

Additionally, a case where the left rod-shaped member 640L, the right rod-shaped member 640R, the screw member 510, and the female thread portion 610 are projected toward the upstream side or the downstream side in the movement direction of the second binding teeth 72 is assumed.

In this case, in the present exemplary embodiment, the screw member 510 and the female thread portion 610 as an example of the load receiving portion are located between the left rod-shaped member 640L and the right rod-shaped member 640R.

In other words, on the virtual plane H13, the screw member 510 and the female thread portion 610 are located between the left rod-shaped member 640L and the right rod-shaped member 640R.

In other words, on the virtual plane H13, the screw member 510 and the female thread portion 610 are located in a region sandwiched between the left rod-shaped member 640L and the right rod-shaped member 640R.

Additionally, in the configuration example illustrated in FIG. 10, a first elastic member 391 for separating the paper bundle T (not illustrated in FIG. 10) after the binding processing from the first binding teeth 71 is attached to the lower support member 700.

Additionally, in the present exemplary embodiment, a second elastic member 392 for separating the paper bundle T after the binding processing from the second binding teeth 72 is attached to the upper support member 630.

In the present exemplary embodiment, in a case where binding is performed on the paper bundle T, the first elastic member 391 and the second elastic member 392 are sandwiched and compressed by the upper support member 630 and the lower support member 700.

Additionally, in the present exemplary embodiment, in a case where the binding on the paper bundle T is completed and the second binding teeth 72 retreat from the first binding teeth 71, the first elastic member 391 and the second elastic member 392 in the compressed state are restored.

Accordingly, the paper bundle T is pressed by the first elastic member 391 and the second elastic member 392, and the paper bundle T is separated from the first binding teeth 71 and the second binding teeth 72.

In addition, although the description is omitted above, the first elastic member 391 and the second elastic member 392 are similarly provided in the second binding processing device 52 illustrated in FIGS. 4 to 9.

Other configuration examples will be further described. In the above, the configuration in which the screw member 510 is connected to the second binding teeth 72 side and the second binding teeth 72 moves has been described as an example, but a configuration in which the screw member 510 is connected to the first binding teeth 71 side and the first binding teeth 71 moves may be adopted.

Additionally, the screw member 510 may be provided corresponding to each of the first binding teeth 71 and the second binding teeth 72, and both the first binding teeth 71 and the second binding teeth 72 may be moved to perform the binding processing.

Additionally, in moving both the first binding teeth 71 and the second binding teeth 72, one common screw member 510 may be connected to the first binding teeth 71 and the second binding teeth 72. In this case, the one screw member 510 is rotated to bring the first binding teeth 71 and the second binding teeth 72 closer to each other and separate from each other.

In a case where one screw member 510 is used, the one screw member 510 is provided with a first thread portion in which a thread groove is directed in the clockwise direction and a second thread portion in which a thread groove is directed in the counterclockwise direction.

Then, in this case, for example, the first thread portion is used to move the first binding teeth 71, and the second thread portion is used to move the second binding teeth 72.

Figure 11:
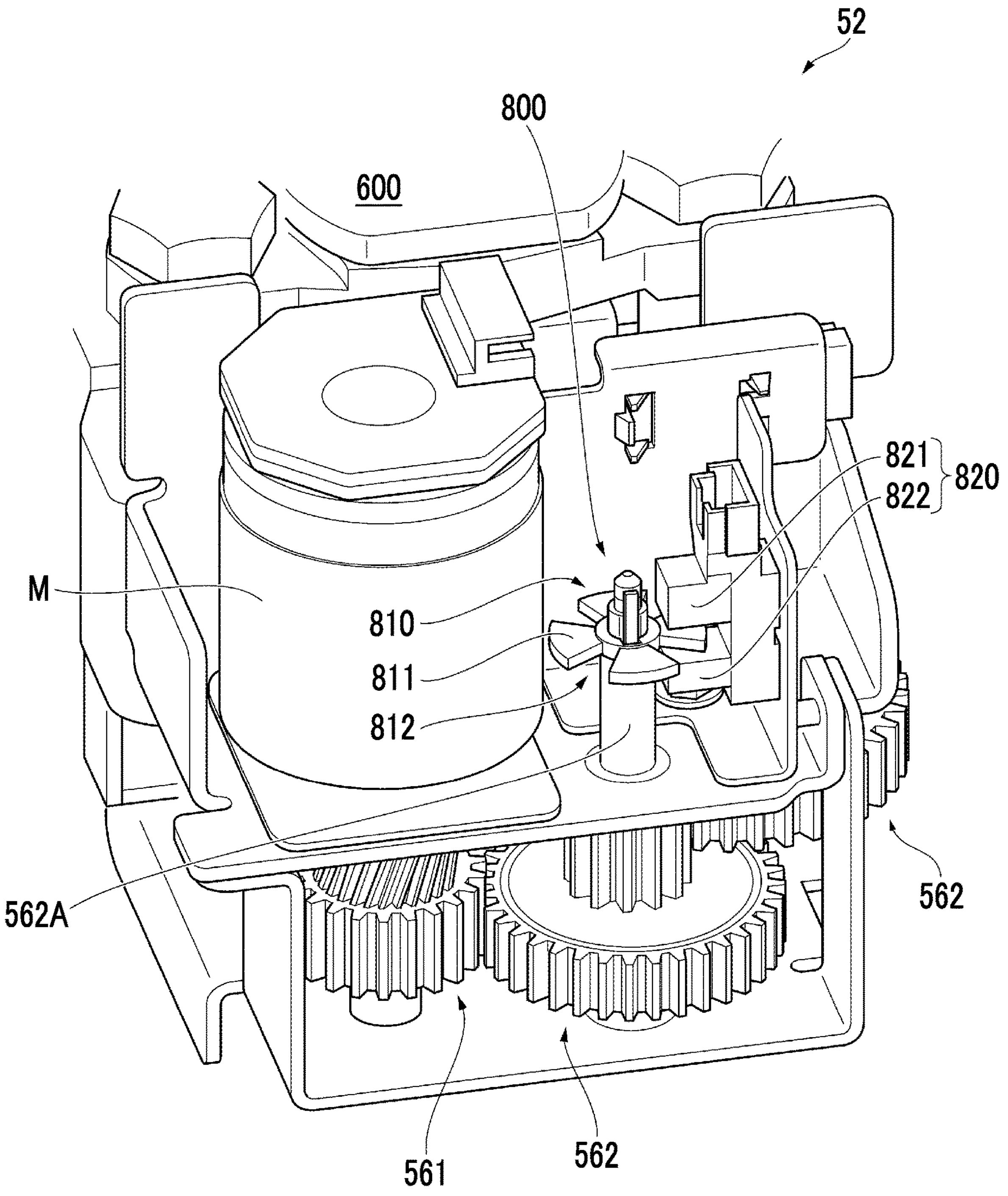
FIG. 11 is a diagram illustrating a state on the back side of the second binding processing device.

FIG. 11 is a diagram illustrating a state on the back side of the second binding processing device 52.

In the present exemplary embodiment, the drive motor M is provided on the back side of the second binding processing device 52. A drive gear 561, which is disposed coaxially with an output shaft of the drive motor M and rotates by receiving a driving force from the drive motor M, is provided below the drive motor M.

Additionally, a plurality of rotary gears 562 that are rotatably provided are provided on the back side of the second binding processing device 52. The plurality of rotary gears 562 receive a rotational driving force from the drive gear 561 and transmit the rotational driving force to the larger-diameter gear 520 (refer to FIGS. 4 and 10).

In the present exemplary embodiment, the driving force from the drive motor M is transmitted to the second binding teeth 72 via the rotary gear 562.

More specifically, the driving force from the drive motor M is transmitted to the second binding teeth 72 via the drive gear 561, the rotary gear 562, the larger-diameter gear 520 (refer to FIGS. 4 and 10), the screw member 510, and the interlocking portion 600.

Accordingly, the second binding teeth 72 move toward the first binding teeth 71, and the second binding teeth 72 retreat from the first binding teeth 71.

Additionally, in the present exemplary embodiment, a position detection sensor 800, which functions as a part of a position detection unit that detects the position of the second binding teeth 72, is provided on the back side of the second binding processing device 52.

The position detection sensor 800 acquires information on the movement amount of the interlocking portion interlocking with the movement of the second binding teeth 72 to detect the position of the second binding teeth 72.

Specifically, the position detection sensor 800 acquires the information on the rotation amount of a rotating portion that rotates in conjunction with the movement of the second binding teeth 72, to detect the position of the second binding teeth 72.

The position detection sensor 800 is constituted by a so-called rotary encoder, and the position detection sensor 800 detects the position of the second binding teeth 72 by using a rotating body 810 and a transmissive sensor 820 that functions as a detection unit that detects the rotation amount of the rotating body 810.

The rotating body 810 is disposed coaxially with the rotary gear 562 and rotates in conjunction with the rotation of the rotary gear 562.

More specifically, the rotating body 810 is disposed coaxially with some rotary gears 562 among the plurality of rotary gears 562 and rotates in conjunction with some rotary gears 562.

In the present exemplary embodiment, a rotating shaft 562A that rotatably supports some rotary gears 562 is provided, and the rotating body 810 is attached to an upper end part of the rotating shaft 562A in the drawing.

The transmissive sensor 820 is provided with a light source 821 that emits light and a light receiving unit 822 that receives light from the light source 821.

The rotating body 810 is provided with a plurality of protruding portions 811 that protrude from a central portion of the rotating body 810 in the radial direction toward an outer side of the rotating body 810 in the radial direction.

The plurality of protruding portions 811 are disposed radially. Additionally, a gap 812 for allowing the light emitted from the light source 821 provided in the transmissive sensor 820 to pass therethrough is provided between the two protruding portions 811 adjacent to each other.

In the present exemplary embodiment, the plurality of protruding portions 811 sequentially pass between the light source 821 provided in the transmissive sensor 820 and the light receiving unit 822 as the rotating body 810 rotates. In the present exemplary embodiment, the rotation amount of the rotating body 810 is detected by sequentially detecting the plurality of protruding portions 811 by the transmissive sensor 820.

The detected information on this rotation amount is output to the information processing unit 100 (refer to FIG. 1), and the information processing unit 100 detects the position of the second binding teeth 72 on the basis of the information on this rotation amount.

Specifically, in the present exemplary embodiment, the relationship between the rotation amount of the rotating body 810 and the movement amount of the second binding teeth 72 is registered in an information storage device 202 (to be described below) in advance, and the information processing unit 100 specifies the movement amount of the second binding teeth 72 on the basis of this relationship registered in the information storage device 202.

More specifically, in a case where the information processing unit 100 obtains the information on the rotation amount of the rotating body 810, the information processing unit 100 refers to the above relationship registered in the information storage device 202 and specifies the movement amount of the second binding teeth 72. Then, the information processing unit 100 detects the position of the second binding teeth 72 on the basis of the specified movement amount.

In addition, the detection of the position of the second binding teeth 72 is not limited to the detection of the rotation amount of the rotating body 810.

For example, a linear encoder extending in the movement direction of the second binding teeth 72 may be installed, and the position of the interlocking portion interlocking with the second binding teeth 72 may be detected by using this linear encoder to detect the position of the second binding teeth 72.

Figure 12:
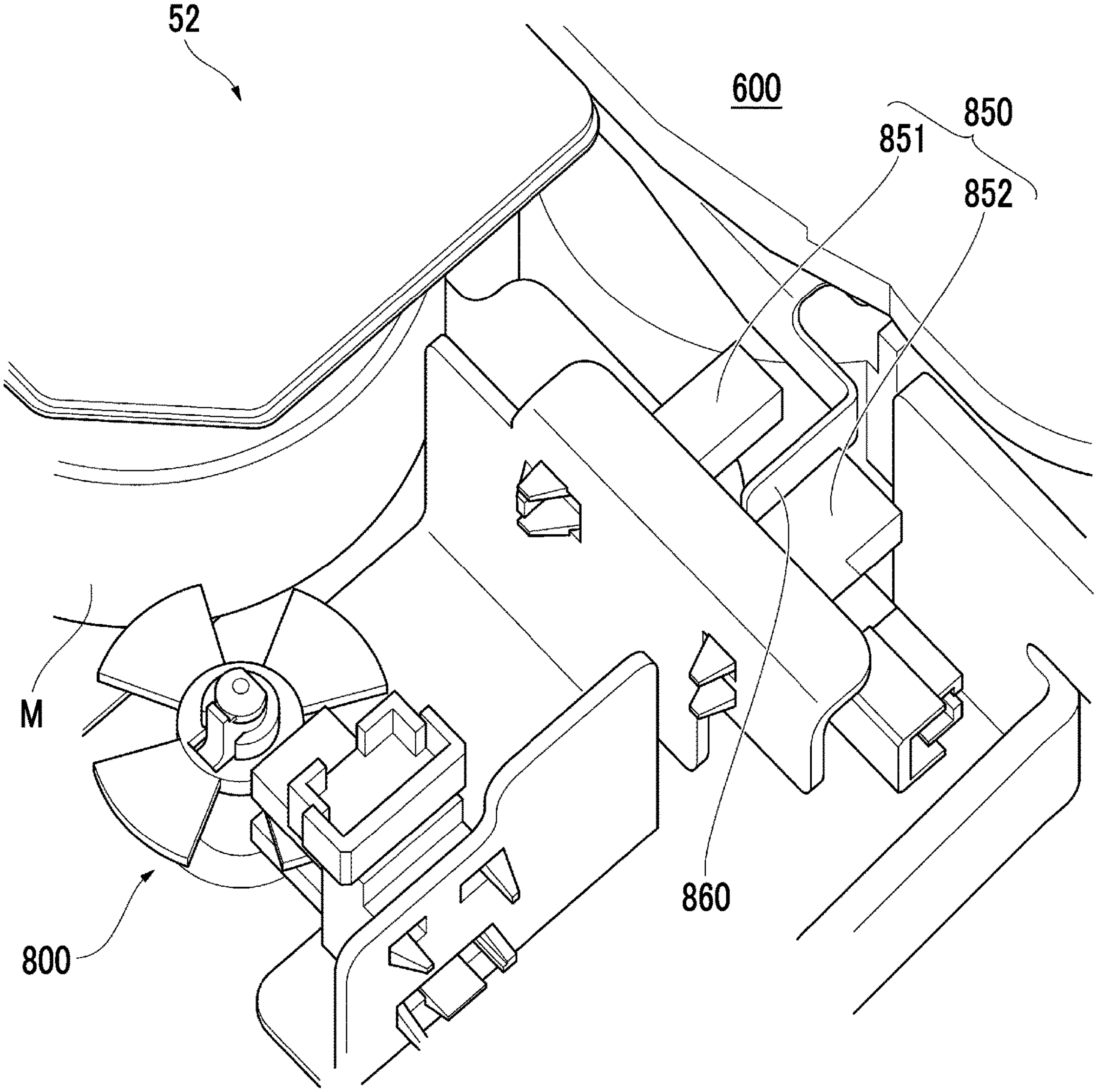
FIG. 12 is a diagram in a case where the second binding processing device is viewed from above.

FIG. 12 is a diagram in a case where the second binding processing device 52 is viewed from above.

The second binding processing device 52 of the present exemplary embodiment is further provided with an initial position sensor 850 for detecting that the second binding teeth 72 (not illustrated in FIG. 12) are at a predetermined initial position.

In the present exemplary embodiment, a protruding piece 860 that functions as an interlocking portion that moves in conjunction with the second binding teeth 72 is provided, and the initial position sensor 850 detects the protruding piece 860.

In the present exemplary embodiment, the information processing unit 100 determines that the second binding teeth 72 are at the initial position in a case where the protruding piece 860 is located at the installation point of the initial position sensor 850 and the protruding piece 860 is detected by the initial position sensor 850.

The initial position sensor 850 is constituted by a transmissive sensor including a light emitting unit 851 and a light receiving unit 852 that receives the light from the light emitting unit 851.

In a case where the protruding piece 860 is at the initial position sensor 850, the light from the light emitting unit 851 is not detected by the light receiving unit 852. In this case, the information processing unit 100 (refer to FIG. 1) determines that the second binding teeth 72 is at the initial position.

On the other hand, in a case where the light from the light emitting unit 851 is detected by the light receiving unit 852, the information processing unit 100 determines that the second binding teeth 72 is at a position other than the initial position.

The protruding piece 860 is attached to the interlocking portion 600 and moves along with the second binding teeth 72. In the present exemplary embodiment, the protruding piece 860 is detected at the installation point of the initial position sensor 850 to detect that the second binding teeth 72 is at the initial position.

In the present exemplary embodiment, in a case where the binding processing of the paper bundle T is performed by the first binding teeth 71 and the second binding teeth 72, the second binding teeth 72 moves towards the paper bundle T and the first binding teeth 71 from this initial position.

Figure 13:
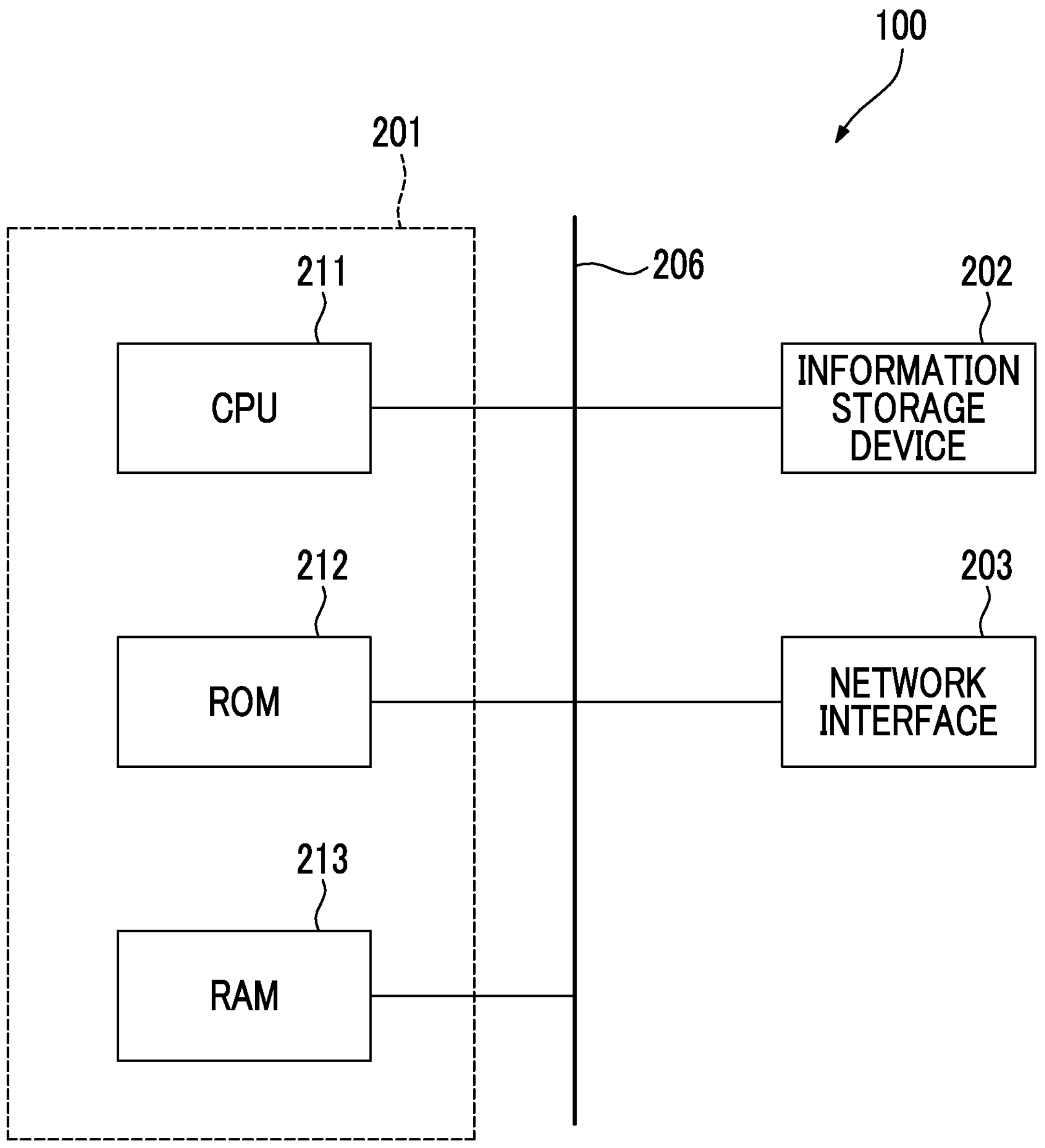
FIG. 13 is a diagram illustrating a hardware configuration of an information processing unit.

FIG. 13 is a diagram illustrating the hardware configuration of the information processing unit 100.

The information processing unit 100 is provided with a processing unit 201, an information storage device 202 that stores information, and a network interface 203 that realizes communication via a local area network (LAN) cable or the like.

The processing unit 201 is constituted by a computer.

The processing unit 201 has a central processing unit (CPU) 211 as an example of a processor that executes various kinds of processing to be described below. Additionally, the processing unit 201 has a read only memory (ROM) 212 in which software is stored and a random access memory (RAM) 213 used as a work area.

The information storage device 202 is realized by existing devices such as a hard disk drive, a semiconductor memory, and a magnetic tape.

The processing unit 201, the information storage device 202, and the network interface 203 are connected to each other via a bus 206 or a signal line (not illustrated).

A program to be executed by the CPU 211 may be provided in the information processing unit 100 in a state in which the program is stored in a computer-readable recording medium such as a magnetic recording medium (magnetic tape, magnetic disk, or the like), an optical recording medium (optical disk, or the like), an optical magnetic recording medium, or a semiconductor memory. Additionally, the program to be executed by the CPU 211 may be provided in the information processing unit 100 by using a communication unit such as the Internet.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Figure 14:
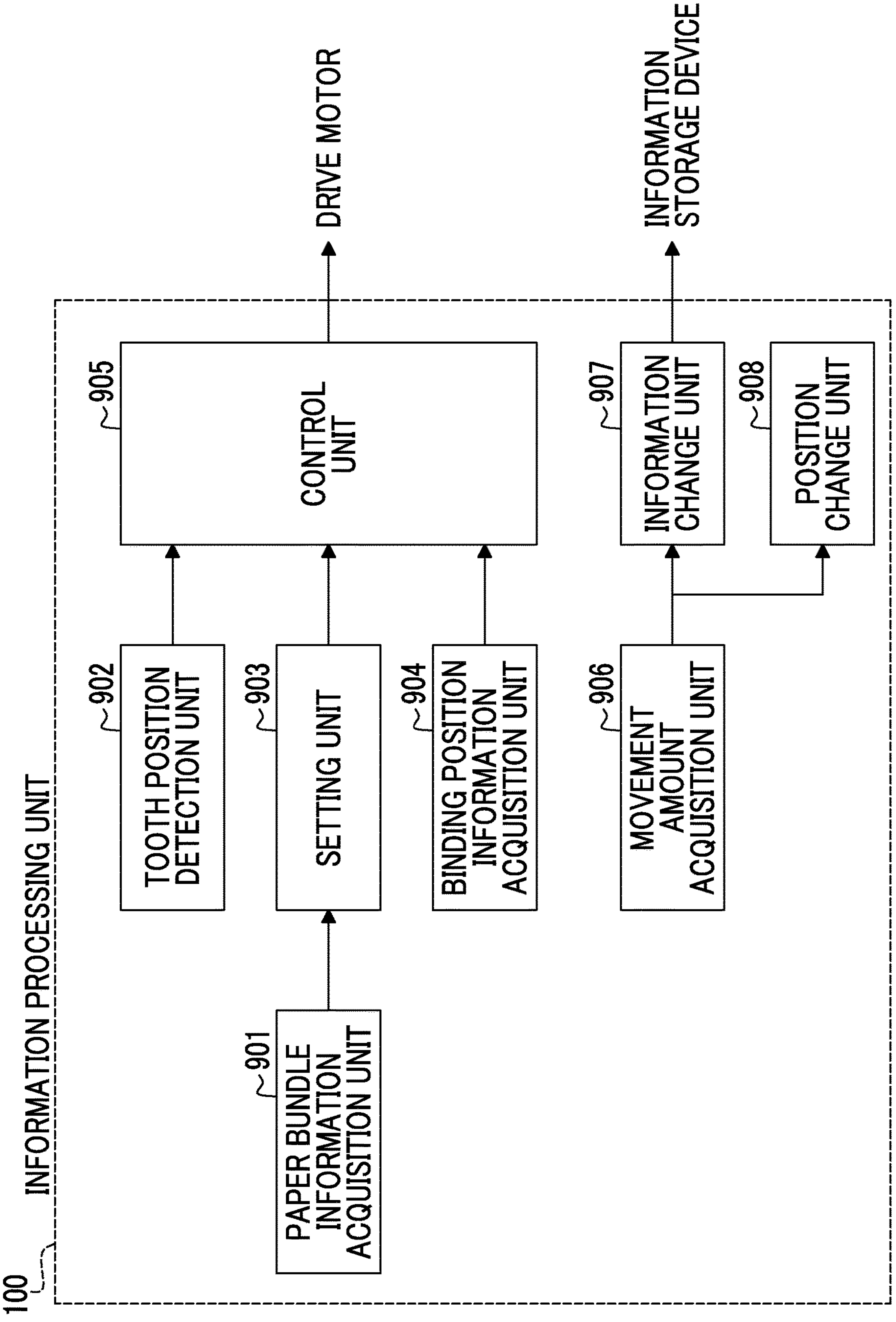
FIG. 14 is a diagram illustrating the functions realized by the information processing unit.

FIG. 14 is a diagram illustrating the functions realized by the information processing unit 100. In addition, FIG. 14 illustrates only the functions related to the binding of the paper bundle T.

In the present exemplary embodiment, the CPU 211 as an example of the processor executes a program stored in the ROM 212 or the information storage device 202. Accordingly, the information processing unit 100 functions as a paper bundle information acquisition unit 901, a tooth position detection unit 902, a setting unit 903, a binding position information acquisition unit 904, a control unit 905, a movement amount acquisition unit 906, an information change unit 907, and a position change unit 908.

The processing to be described below is performed by the respective functional units of the paper bundle information acquisition unit 901 to the change unit 908. The functional units are realized as the CPU 211 executes the program, and the processing to be described below can be said to be the processing performed by the CPU 211 as an example of the processor.

The paper bundle information acquisition unit 901 as an example of a recording medium bundle information acquisition unit acquires paper bundle information that is information on the paper bundle T that is an example of the recording medium bundle. In other words, the paper bundle information acquisition unit 901 acquires the paper bundle information that is the information on the paper bundle T to be a binding processing target by the first binding teeth 71 and the second binding teeth 72.

Although the description is omitted above, as illustrated in FIG. 1, a reception device 915 for receiving information input by a user is provided in the present exemplary embodiment.

In the present exemplary embodiment, the user operates, for example, a touch panel provided on the reception device 915 and inputs information required for the binding processing.

The paper bundle information acquisition unit 901 acquires the paper bundle information, which is the information on the paper bundle T to be a binding processing target, from the information received by the reception device 915.

In addition, the input of the information by the user may be performed by a terminal device such as a personal computer (PC) connected to the image forming system 1.

In this case, the paper bundle information acquisition unit 901 acquires the paper bundle information from the information received by the terminal device.

The user inputs, for example, the thickness information of each paper P constituting the paper bundle T, the sheet number information of the paper P constituting the paper bundle T, and type information that is information on the type of the paper P constituting the paper bundle T, as the paper bundle information, via the reception device 915 or the terminal device.

Correspondingly, the paper bundle information acquisition unit 901 acquires the thickness information, the sheet number information, and the type information as the paper bundle information.

In addition, there is a case where these kinds of information is included in job information, and there is also a case where the paper bundle information acquisition unit 901 acquires these kinds of information on the basis of the information included in the job information.

The tooth position detection unit 902 as an example of the position detection unit detects the position of the second binding teeth 72.

Specifically, the tooth position detection unit 902 detects a movement direction position of the second binding teeth 72 in a case where the second binding teeth 72 move toward the first binding teeth 71 (hereinafter referred to as a "movement direction position").

In the present exemplary embodiment, the tooth position detection unit 902 acquires information on the movement amount of a portion interlocking with the movement of the second binding teeth 72 to detect the movement direction position of the second binding teeth 72.

Specifically, in the present exemplary embodiment, the tooth position detection unit 902 acquires the information on the rotation amount of the rotating portion that rotates in conjunction with the movement of the second binding teeth 72, to detect the movement direction position of the second binding teeth 72.

More specifically, the tooth position detection unit 902 acquires the information on the rotation amount of the above rotating body 810 provided in the position detection sensor 800 (refer to FIG. 11) from the position detection sensor 800, to detect the movement direction position of the second binding teeth 72.

More specifically, the tooth position detection unit 902 detects the movement direction position of the second binding teeth 72 on the basis of the information on the rotation amount of the rotating body 810 and the information from the initial position sensor 850 (refer to FIG. 12).

More specifically, the tooth position detection unit 902 detects the movement direction position of the second binding teeth 72 on the basis of the rotation amount of the rotating body 810 after the protruding piece 860 is not detected by the initial position sensor 850.

In other words, the tooth position detection unit 902 detects the movement direction position of the second binding teeth 72 on the basis of the rotation amount of the rotating body 810 after the second binding teeth 72 departs from the initial position.

Although the description is omitted above, in the present exemplary embodiment, the movement amount of the second binding teeth 72 per rotation of the rotating body 810 (referred to as "movement amount per rotation") is registered in the information storage device 202.

In a case where the tooth position detection unit 902 acquires the information on the rotation amount of the rotating body 810 from the position detection sensor 800, the tooth position detection unit 902 multiplies this rotation amount by the movement amount per rotation to obtain the movement amount of the second binding teeth 72.

Accordingly, the tooth position detection unit 902 detects the movement direction position of the second binding teeth 72 in a case where the initial position is the origin.

The setting unit 903 sets the movement amount of the second binding teeth 72 on the basis of the paper bundle information acquired by the paper bundle information acquisition unit 901. In other words, the setting unit 903 changes setting information that has already been set for the movement amount of the second binding teeth 72.

In the present exemplary embodiment, as the paper bundle information, as described above, the thickness information of the paper P, the sheet number information of the paper P, and the type information of the paper P are acquired. The setting unit 903 sets the movement amount of the second binding teeth 72 on the basis of these kinds of information.

More specifically, the setting unit 903 sets the movement amount of the second binding teeth 72 by increasing or decreasing the corrected movement amount, which will be to be described below, on the basis of this information.

For example, in a case where the thickness specified by the thickness information is equal to or more than a predetermined first threshold value and equal to or less than a predetermined second threshold value (>first threshold value), the setting unit 903 keeps the movement amount of the second binding teeth 72 as the corrected movement amount to be described below.

Additionally, for example, in a case where the thickness specified by the thickness information is smaller than the first threshold value, the setting unit 903 sets the movement amount of the second binding teeth 72 such that the movement amount of the second binding teeth 72 is smaller than that in a case where the thickness is larger than the first threshold value.

In other words, in this case, the setting unit 903 sets the movement amount of the second binding teeth 72 such that the movement amount of the second binding teeth 72 is smaller than the corrected movement amount to be described below.

Additionally, on the contrary, in a case where the thickness specified by the thickness information is larger than the second threshold value, the setting unit 903 sets the movement amount of the second binding teeth 72 such that the movement amount of the second binding teeth 72 is larger than that in a case where the thickness is smaller than the second threshold value.

In other words, in this case, the setting unit 903 sets the movement amount of the second binding teeth 72 such that the movement amount of the second binding teeth 72 is larger than the corrected movement amount to be described below.

Additionally, for example, in a case where the number of sheets specified by the sheet number information is equal to or more than a predetermined first threshold value and equal to or less than a predetermined second threshold value (>first threshold value), the setting unit 903 keeps the movement amount of the second binding teeth 72 as the corrected movement amount.

Additionally, for example, in a case where the number of sheets specified by the sheet number information is smaller than the first threshold value, the setting unit 903 sets the movement amount of the second binding teeth 72 such that the movement amount of the second binding teeth 72 is smaller than that in a case where the number of sheets is larger than the first threshold value.

In other words, in this case, the setting unit 903 sets the movement amount of the second binding teeth 72 such that the movement amount of the second binding teeth 72 is smaller than the corrected movement amount.

Additionally, on the contrary, in a case where the number of sheets specified by the sheet number information is larger than the second threshold value, the setting unit 903 sets the movement amount of the second binding teeth 72 such that the movement amount of the second binding teeth 72 is larger than that in a case where the number of sheets is smaller than the second threshold value.

In other words, in this case, the setting unit 903 sets the movement amount of the second binding teeth 72 such that the movement amount of the second binding teeth 72 is larger than the corrected movement amount.

Additionally, for example, in a case where the type of the paper P specified by the type information is a specific type, the setting unit 903 sets the movement amount of the second binding teeth 72 such that the movement amount of the second binding teeth 72 is smaller or larger than that in the case where the type of the paper P is not the specific type.

In other words, for example, in a case where the type of the paper P specified by the type information is a specific type, the setting unit 903 sets the movement amount of the second binding teeth 72 such that the movement amount of the second binding teeth 72 is smaller than the corrected movement amount.

In the present exemplary embodiment, in a case where the movement amount is set by the setting unit 903, the control unit 905 controls the movement of the second binding teeth 72 on the basis of the movement amount set by the setting unit 903 and the movement direction position detected by the tooth position detection unit 902.

In the present exemplary embodiment, the corrected movement amount to be described below is set for the movement amount of the second binding teeth 72, and the corrected movement amount is registered in the information storage device 202 as the setting information.

Normally, in a case where the second binding teeth 72 is moved, the control unit 905 moves the second binding teeth 72 by the corrected movement amount.

In contrast, in a case where the setting unit 903 sets a movement amount larger or smaller than the corrected movement amount, the control unit 905 moves the second binding teeth 72 by the larger movement amount or the smaller movement amount.

Next, the binding position information acquisition unit 904 will be described.

The binding position information acquisition unit 904 acquires binding position information that is information on a binding position by the first binding teeth 71 and the second binding teeth 72 and on a binding position in the paper bundle T.

Specifically, the binding position information acquisition unit 904 acquires, for example, information on whether the binding position in the paper bundle T is a lateral edge of the paper bundle T or a corner portion of the paper bundle T, as the binding position information.

In the present exemplary embodiment, in starting the binding processing, the user inputs the binding position information to the reception device 915 or the terminal device. Alternatively, there is also a case where the job information includes the binding position information.

The binding position information acquisition unit 904 acquires the binding position information received by the reception device 915 or the terminal device and the binding position information included in the job information, to acquire the binding position information.

The control unit 905 executes various kinds of processing related to the binding of the paper bundle T.

The control unit 905 control the movement of the second binding teeth 72, for example, on the basis of the paper bundle information acquired by the paper bundle information acquisition unit 901 and the movement direction position of the second binding teeth 72 detected by the tooth position detection unit 902.

More specifically, in the present exemplary embodiment, the setting unit 903 sets the movement amount of the second binding teeth 72 on the basis of the paper bundle information. The control unit 905 controls the movement of the second binding teeth 72 on the basis of the set movement amount and the movement direction position of the second binding teeth 72 detected by the tooth position detection unit 902.

In addition, in a configuration in which the setting unit 903 is not indispensable and the setting unit 903 is not provided, the control unit 905 controls the movement of the second binding teeth 72 on the basis of the corrected movement amount to be described below and the movement direction position detected by the tooth position detection unit 902.

The control unit 905 monitors the movement direction position detected by the tooth position detection unit 902, and determines whether the second binding teeth 72 has reached the position specified by the movement amount set by the setting unit 903 and the corrected movement amount.

Then, in a case where the second binding teeth 72 has reached the position specified by the movement amount set by the setting unit 903 or the corrected movement amount, the control unit 905 stops the driving of the drive motor M.

Additionally, the control unit 905 controls the movement of the second binding teeth 72 on the basis of the binding position information acquired by the binding position information acquisition unit 904 and the movement direction position detected by the tooth position detection unit 902.

In the present exemplary embodiment, the movement amount of the second binding teeth 72 is set in advance for each binding position information acquired by the binding position information acquisition unit 904, and the information on the binding position and the information on the movement amount of the second binding teeth 72 are registered in the information storage device 202 in a mutually associated state.

In a case where the control unit 905 obtains the binding position information acquired by the binding position information acquisition unit 904, the control unit 905 refers to the information registered in the information storage device 202 and the movement amount of the second binding teeth 72 associated with the binding position information.

In this case, the control unit 905 obtains a movement amount of a different value depending on whether or not the binding position is the lateral edge of the paper bundle T and whether or not the binding position is a corner portion.

Next, the control unit 905 controls the movement of the second binding teeth 72 such that the second binding teeth 72 reaches the position specified by the movement amount while monitoring the position of the second binding teeth 72 on the basis of the movement direction position detected by the tooth position detection unit 902.

Additionally, the control unit 905 of the present exemplary embodiment performs the processing of moving the second binding teeth 72 toward the first binding teeth 71 and pressing the second binding teeth 72 against the first binding teeth 71 in a state where there is no paper bundle T between the first binding teeth 71 and the second binding teeth 72.

More specifically, the control unit 905 performs the processing of driving the drive motor M to move the second binding teeth 72 toward the first binding teeth 71 and press the second binding teeth 72 against the first binding teeth 71 in a state where there is no paper bundle T between the first binding teeth 71 and the second binding teeth 72.

More specifically, in a state where there is no paper bundle T between the first binding teeth 71 and the second binding teeth 72, the control unit 905 moves the second binding teeth 72 to press the second binding teeth 72 against the first binding teeth 71 until the second binding teeth 72 comes into contact with the first binding teeth 71.

Accordingly, the posture of the second binding teeth 72 with respect to the first binding teeth 71 is corrected.

Next, the movement amount acquisition unit 906 will be described.

The movement amount acquisition unit 906 acquires the movement amount of the second binding teeth 72 in a case where the control unit 905 presses the second binding teeth 72 against the first binding teeth 71.

In the present exemplary embodiment, as described above, the control unit 905 presses the second binding teeth 72 against the first binding teeth 71 in a state where there is no paper bundle T between the first binding teeth 71 and the second binding teeth 72.

The movement amount acquisition unit 906 acquires the movement amount of the second binding teeth 72 in a case where this pressing is performed.

Specifically, the movement amount acquisition unit 906 acquires the movement amount of the second binding teeth 72 until the second binding teeth 72 is pressed against the first binding teeth 71 after the movement of the second binding teeth 72 at the initial position is started.

The movement amount acquisition unit 906 acquires the information on the rotation amount of the rotating body 810 until the second binding teeth 72 is pressed against the first binding teeth 71 after the movement of the second binding teeth 72 at the initial position is started.

In other words, the movement amount acquisition unit 906 obtains the information on the rotation amount of the rotating body 810 from the position detection sensor 800, thereby acquiring the information on the rotation amount of the rotating body 810 until the second binding teeth 72 is pressed against the first binding teeth 71 after the movement of the second binding teeth 72 at the initial position is started.

Then, the movement amount acquisition unit 906 acquires the movement amount of the second binding teeth 72 on the basis of the information on the rotation amount.

In the present exemplary embodiment, as described above, the movement amount per rotation, which is the movement amount of the second binding teeth 72 per rotation of the rotating body 810, is registered in the information storage device 202.

In a case where the movement amount acquisition unit 906 obtains the information on the rotation amount of the rotating body 810, the movement amount acquisition unit 906 multiplies this rotation amount by the movement amount per rotation to acquire the movement amount of the second binding teeth 72.

In addition, the movement amount acquisition unit 906 determines whether or not the second binding teeth 72 has been pressed against the first binding teeth 71, for example, by referring to the current value of the current supplied to the drive motor M.

Specifically, the movement amount acquisition unit 906 determines that the second binding teeth 72 has been pressed against the first binding teeth 71 in a case where the current value does not increase and the current value becomes constant.

Additionally, the movement amount acquisition unit 906 determines whether or not the second binding teeth 72 has been pressed against the first binding teeth 71, for example, on the basis of the information on the rotation amount of the rotating body 810 output from the position detection sensor 800.

Specifically, the movement amount acquisition unit 906 determines that the second binding teeth 72 has been pressed against the first binding teeth 71 in a case where the rotation amount does not increase and the value of the rotation amount does not change.

The information change unit 907 changes the setting information, which is the information set for the second binding teeth 72, on the basis of the movement amount acquired by the movement amount acquisition unit 906.

Specifically, the information change unit 907 changes the setting information set for the second binding teeth 72 and the setting information affecting the movement amount of the second binding teeth 72, on the basis of the movement amount acquired by the movement amount acquisition unit 906.

Accordingly, in the present exemplary embodiment, in a case where the movement amount acquired by the movement amount acquisition unit 906 is larger or smaller than a reference movement amount registered in the information storage device 202, the movement amount of the second binding teeth 72 is changed.

In the present exemplary embodiment, in a case where the movement amount acquired by the movement amount acquisition unit 906 is larger or smaller than the reference movement amount registered in the information storage device 202, the movement amount is corrected, and the corrected movement amount is generated.

Then, in the present exemplary embodiment, the corrected movement amount is registered in the information storage device 202, and thereafter, the corrected movement amount becomes a new reference, and the second binding teeth 72 move by the corrected movement amount.

Accordingly, even in a case where the gap between the first binding teeth 71 and the second binding teeth 72 is larger or smaller than a predetermined gap, the second binding teeth 72 is advanced to a predetermined advance position.

In the present exemplary embodiment, in a case where the gap between the first binding teeth 71 and the second binding teeth 72 is larger or smaller than the predetermined gap in this way, the reference movement amount that is initially set is corrected, and the corrected movement amount is generated.

Additionally, in the present exemplary embodiment, there is also a case where each of the paper bundles T to be binding targets may be different depending on each binding processing. In order to cope with this, the above setting unit 903 sets a new movement amount of the second binding teeth 72 with the corrected movement amount as a reference, depending on the paper bundle T.

The corrected movement amount is changed depending on the paper bundle T, and the movement amount of the second binding teeth 72 becomes a movement amount larger or smaller than the corrected movement amount depending on the paper bundle T.

Figure 15:
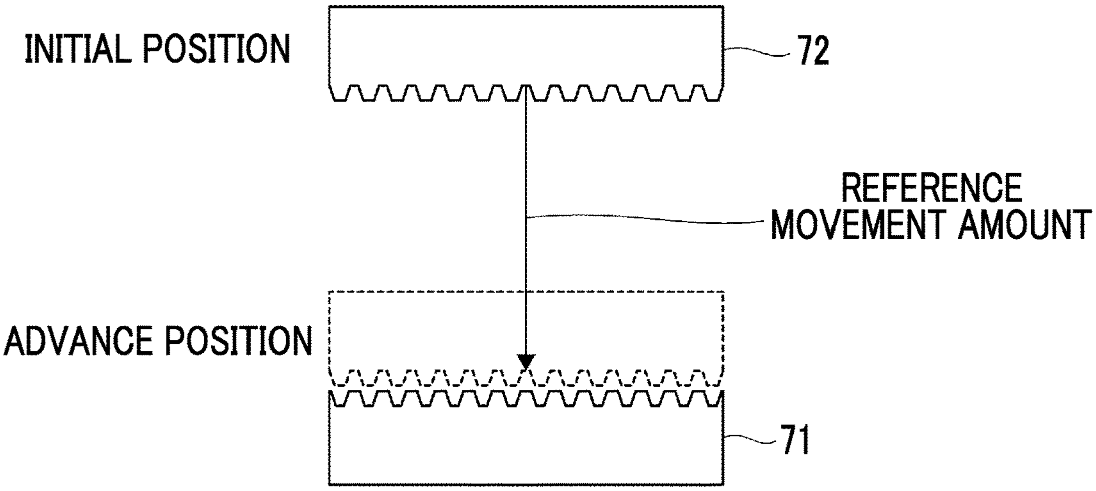
FIG. 15 is a diagram illustrating first binding teeth and second binding teeth.

Giving a further description with reference to FIG. 15 (a diagram illustrating the first binding teeth 71 and the second binding teeth 72), in the present exemplary embodiment, the reference movement amount is initially set as the movement amount from the initial position to the advance position of the second binding teeth 72.

This reference movement amount is registered in the information storage device 202 as initial setting information.

Then, in the present exemplary embodiment, this reference movement amount is corrected depending on the size of the gap between the first binding teeth 71 and the second binding teeth 72, and the corrected movement amount is generated as described above.

Then, this corrected movement amount is registered in the information storage device 202 as changed setting information.

Additionally, in the present exemplary embodiment, as described above, the corrected movement amount is increased or decreased depending on the paper bundle T to be a binding processing target, and the corrected movement amount after the increase or decrease is performed is the final movement amount of the second binding teeth 72.

In addition, in the present exemplary embodiment, the corrected movement amount is generated even in a case where the size of the gap between the first binding teeth 71 and the second binding teeth 72 is an originally predetermined size.

In this case, the corrected movement amount is maintained as the initial reference movement amount, and a movement amount having the same value as the initial reference movement amount is set as the corrected movement amount.

Also, in the present exemplary embodiment, the movement of the second binding teeth 72 is subsequently controlled on the basis of the corrected movement amount.

In the present exemplary embodiment, in this way, the initial reference movement amount is changed depending on the magnitude of the movement amount of the second binding teeth 72. In other words, in the present exemplary embodiment, the initial reference movement amount is changed depending on the magnitude of the gap between the first binding teeth 71 and the second binding teeth 72.

Here, for example, in a case where the gap between the first binding teeth 71 and the second binding teeth 72 is larger than an assumed gap and in a case where the second binding teeth 72 is moved by the initial reference movement amount, the second binding teeth 72 stops before the originally predetermined advance position of the second binding teeth 72.

Additionally, in a case where the gap between the first binding teeth 71 and the second binding teeth 72 is smaller than the assumed gap and in a case where the second binding teeth 72 is moved by the initial reference movement amount, the second binding teeth 72 advances ahead of the originally predetermined advance position of the second binding teeth 72.

For this reason, in the present exemplary embodiment, the corrected movement amount is generated from the initial reference movement amount depending on the magnitude of the movement amount of the second binding teeth 72, and thereafter, the movement amount of the second binding teeth 72 is set as a movement amount larger or smaller than the reference movement amount.

Accordingly, the advance position of the second binding teeth 72 approaches the originally predetermined advance position.

Next, the position change unit 908 (refer to FIG. 14) will be described.

The position change unit 908 changes the initial position of the second binding teeth 72 on the basis of the movement amount acquired by the movement amount acquisition unit 906.

Accordingly, in the present exemplary embodiment, in a case where the movement amount acquired by the movement amount acquisition unit 906 is larger or smaller than the initial reference movement amount, the initial position of the second binding teeth 72 can be changed. Even in this case, the advance position of the second binding teeth 72 can be brought closer to the originally predetermined advance position.

In a case where the initial position of the second binding teeth 72 is changed, the advance position of the second binding teeth 72 also becomes different. In this case, even in a case where the gap between the first binding teeth 71 and the second binding teeth 72 is larger or smaller than expected, the second binding teeth 72 can be advanced to the originally predetermined advance position.

Figure 16:
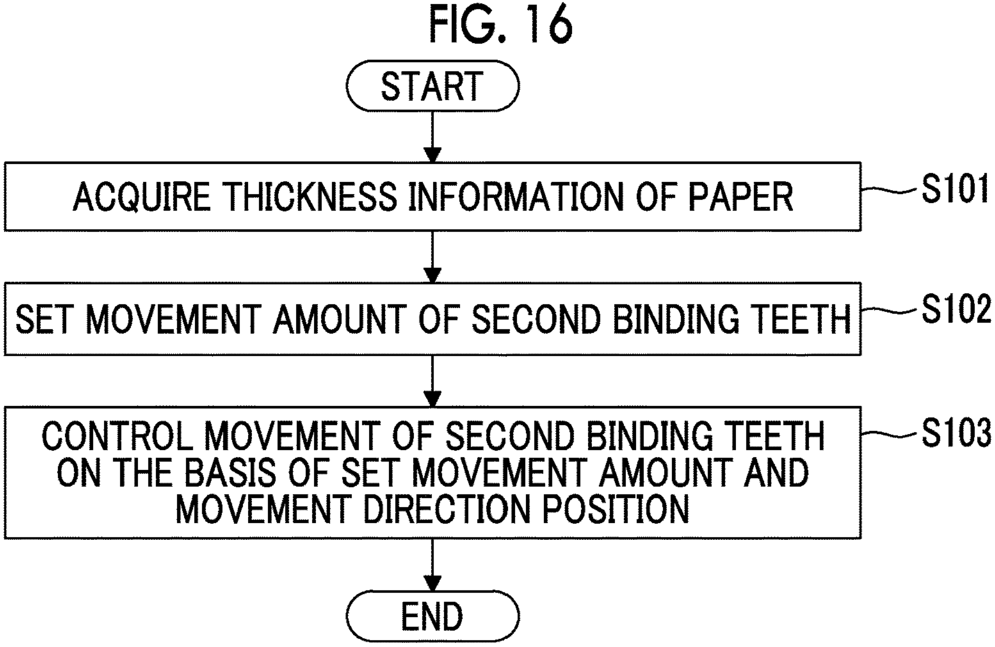
FIG. 16 is a flowchart illustrating a flow of the processing executed in the present exemplary embodiment.

The details of the processing will be described below. FIG. 16 is a flowchart illustrating a flow of the processing executed in the present exemplary embodiment.

In the present exemplary embodiment, as described above, the control unit 905 moves the control of the second binding teeth 72 on the basis of the paper bundle information acquired by the paper bundle information acquisition unit 901 and the movement direction position detected by the tooth position detection unit 902.

In the present exemplary embodiment, as described above, the paper bundle information acquisition unit 901 acquires, for example, the thickness information of the paper P as the paper bundle information (Step S101).

More specifically, in the present exemplary embodiment, the paper bundle information acquisition unit 901 acquires the thickness information of the paper P constituting the paper bundle T as the paper bundle information.

In a case where the paper bundle information acquisition unit 901 acquires the thickness information in Step S101, the setting unit 903 sets the movement amount of the second binding teeth 72 on the basis of the thickness information (Step S102).

Then, in the present exemplary embodiment, the control unit 905 controls the movement of the second binding teeth 72 on the basis of the set movement amount, and the movement direction position detected by the tooth position detection unit 902 (Step S103).

Giving a description by way of a specific example, for example, in a case where the thickness specified by the thickness information is equal to or more than the predetermined first threshold value and equal to or less than the predetermined second threshold value (>first threshold value), the setting unit 903 keeps the movement amount of the second binding teeth 72 as the above corrected movement amount.

Additionally, for example, in a case where the thickness specified by the thickness information is smaller than the predetermined first threshold value, the setting unit 903 sets the movement amount of the second binding teeth 72 such that the movement amount of the second binding teeth 72 is smaller than that in a case where the thickness is larger than the first threshold value.

In other words, in this case, the setting unit 903 sets the movement amount of the second binding teeth 72 such that the movement amount of the second binding teeth 72 is smaller than the corrected movement amount.

Additionally, for example, in a case where the thickness specified by the thickness information is larger than the predetermined second threshold value (>first threshold value), the setting unit 903 sets the movement amount of the second binding teeth 72 such that the movement amount of the second binding teeth 72 is larger than that in a case where the thickness is smaller than the second threshold value.

In other words, in this case, the setting unit 903 sets the movement amount of the second binding teeth 72 such that the movement amount of the second binding teeth 72 is larger than the corrected movement amount.

In a case where the movement amount of the second binding teeth 72 is set by the setting unit 903, the control unit 905 controls the movement of the second binding teeth 72 on the basis of the movement amount set by the setting unit 903 and the movement direction position detected by the tooth position detection unit 902.

More specifically, the control unit 905 monitors the movement direction position detected by the tooth position detection unit 902 and determines whether or not the second binding teeth 72 has reached the position specified by the movement amount set by the setting unit 903.

Then, in a case where the second binding teeth 72 have reached the position specified by the movement amount set by the setting unit 903, the control unit 905 stops the driving of the drive motor M.

In the present exemplary embodiment, in this way, in a case where the thickness specified by the thickness information is smaller than the first threshold value, the movement amount of the second binding teeth 72 is set such that the movement amount of the second binding teeth 72 is smaller than that in a case where the thickness is larger than the first threshold value.

Accordingly, problems such that a load is excessively applied to the paper bundle T and the paper bundle T breaks are less likely to occur.

In a case where the paper bundle T is thin, the load required for binding is smaller than that in a case where the paper bundle T is thick. As in the present exemplary embodiment, in a case where the thickness specified by the thickness information of the paper P is smaller than the first threshold value, which is a predetermined threshold value and in a case where the movement amount of the second binding teeth 72 is reduced, problems such that the load to the paper bundle T is reduced and the paper bundle T breaks are less likely to occur.

Additionally, in the present exemplary embodiment, as described above, in a case where the thickness specified by the thickness information is larger than the second threshold value, the movement amount of the second binding teeth 72 is set such that the movement amount of the second binding teeth 72 is larger than that in a case where the thickness is smaller than the second threshold value.

Accordingly, the load required for binding the paper bundle T can be increased, and even in a case where the paper bundle T becomes thicker as the thickness of the paper P is larger, the load for performing the binding reliably is exerted on the paper bundle T.

In addition, in the present exemplary embodiment, as described above, the setting unit 903 may set the movement amount of the second binding teeth 72 on the basis of the sheet number information of the paper P, which is an example of the paper bundle information.

In this case, for example, in a case where the number of sheets specified by the sheet number information is equal to or more than the predetermined first threshold value and equal to or less than the predetermined second threshold value (>first threshold value), the setting unit 903 keeps the movement amount of the second binding teeth 72 as the corrected movement amount.

Additionally, for example, in a case where the number of sheets specified by the sheet number information is smaller than the first threshold value, the setting unit 903 sets the movement amount of the second binding teeth 72 such that the movement amount of the second binding teeth 72 is smaller than that in a case where the number of sheets is larger than the first threshold value.

In other words, in this case, the setting unit 903 sets the movement amount of the second binding teeth 72 such that the movement amount of the second binding teeth 72 is smaller than the corrected movement amount.

Accordingly, even in this case, the load acting on the paper bundle T is reduced, and the breakage of the paper bundle T is suppressed.

In a case where the number of sheets of the paper P constituting the paper bundle T is small, the load required for binding the paper bundle T becomes small, and in a case where the load during the binding of the paper bundle T is kept large, the paper bundle T is likely to break.

In contrast, in a case where the movement amount of the second binding teeth 72 becomes small, the load acting on the paper bundle T becomes small, and the paper bundle T is less likely to break.

Additionally, in a case where the number of sheets specified by the sheet number information is larger than the predetermined second threshold value (>first threshold value), the setting unit 903 sets the movement amount of the second binding teeth 72 such that the movement amount of the second binding teeth 72 is larger than that in a case where the number of sheets is smaller than the second threshold value.

In other words, in this case, the setting unit 903 sets the movement amount of the second binding teeth 72 such that the movement amount of the second binding teeth 72 is larger than the corrected movement amount.

In this case, similar to the above, the load required for binding the paper bundle T may be increased, and even a thick paper bundle T having a large number of sheets of the paper P may be bound more reliably.

Additionally, in the present exemplary embodiment, as described above, the setting unit 903 may set the movement amount of the second binding teeth 72 on the basis of the type information of the paper P specified by the paper bundle information.

More specifically, in this case, for example, in a case where the type of the paper P specified by the type information is a specific type, the setting unit 903 sets the movement amount of the second binding teeth 72 such that the movement amount of the second binding teeth 72 is smaller or larger than that in the case where the type of the sheet P is not the specific type.

In other words, for example, in a case where the type of the paper P specified by the type information is a specific type, the setting unit 903 sets the movement amount of the second binding teeth 72 such that the movement amount of the second binding teeth 72 is smaller than the corrected movement amount.

There is a case where reducing the load acting on the paper bundle T or increasing the load acting on the paper bundle T is better depending on the type of the paper P. By setting the movement amount of the second binding teeth 72 on the basis of the information on the type of the paper P, the load acting on the paper bundle T may be increased or decreased depending on the type of the paper P constituting the paper bundle T.

Here, in controlling the movement of the second binding teeth 72 by the control unit 905, controlling the movement of the second binding teeth 72 on the basis of the movement amount set by the setting unit 903 is conceivable.

Specifically, in this case, for example, an aspect in which the number of pulses for driving the drive motor M is set on the basis of the movement amount set by the setting unit 903 and the second binding teeth 72 is controlled on the basis of the set number of pulses is conceivable.

Meanwhile, it is also assumed that the second binding teeth 72 do not move as assumed. In this case, in a case where the second binding teeth 72 is controlled on the basis of the number of pulses, the second binding teeth 72 advances ahead of the predetermined position or the second binding teeth 72 stops before this predetermined position.

In this case, a load may be applied to the paper bundle T and the paper bundle T breaks or the binding is incomplete.

In contrast, in a case where the movement of the second binding teeth 72 is controlled in consideration of the movement direction position detected by the tooth position detection unit 902 as in the present exemplary embodiment, the difference between the movement amount set by the setting unit 903 and the actual movement amount of the second binding teeth 72 becomes small, and the paper bundle T may be bound more reliably.

Figure 17:
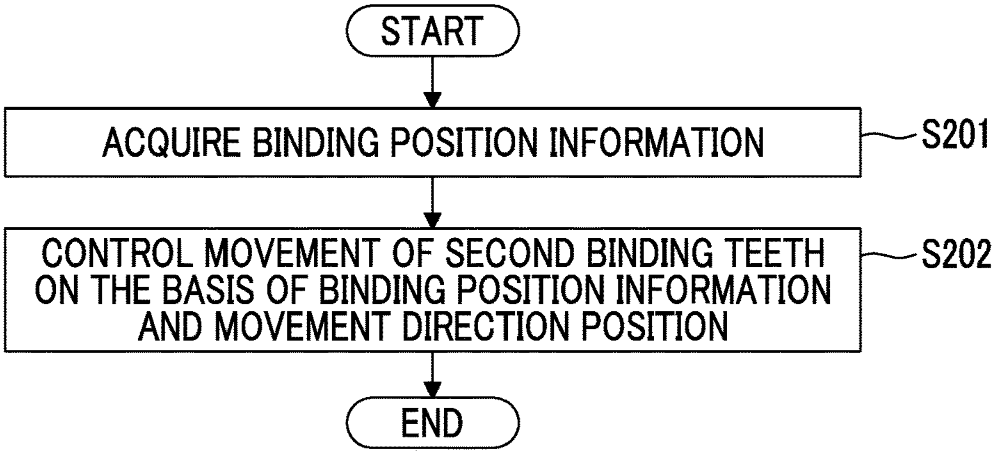
FIG. 17 is a flowchart illustrating a flow of other processing that can be executed in the present exemplary embodiment.

FIG. 17 is a flowchart illustrating a flow of other processing that can be executed in the present exemplary embodiment.

In the present exemplary embodiment, as described above, the control unit 905 controls the movement of the second binding teeth 72 on the basis of the binding position information acquired by the binding position information acquisition unit 904 and the movement direction position detected by the tooth position detection unit 902.

In this processing, first, the binding position information acquisition unit 904 acquires the binding position information that is the information on the binding position by the first binding teeth 71 and the second binding teeth 72 and on the binding position in the paper bundle T (Step S201).

Specifically, as described above, the binding position information acquisition unit 904 acquires, for example, the information on whether the binding position in the paper bundle T is the lateral edge of the paper bundle T or the corner portion of the paper bundle T, as the binding position information.

Next, the control unit 905 controls the movement of the second binding teeth 72 on the basis of the binding position information acquired by the binding position information acquisition unit 904 and the movement direction position detected by the tooth position detection unit 902 (Step S202).

Also in this processing example, the tooth position detection unit 902 detects the movement direction position that is the position of the second binding teeth 72.

The control unit 905 controls the movement of the second binding teeth 72 on the basis of the binding position information acquired by the binding position information acquisition unit 904 and the movement direction position detected by the tooth position detection unit 902.

Figure 18A:
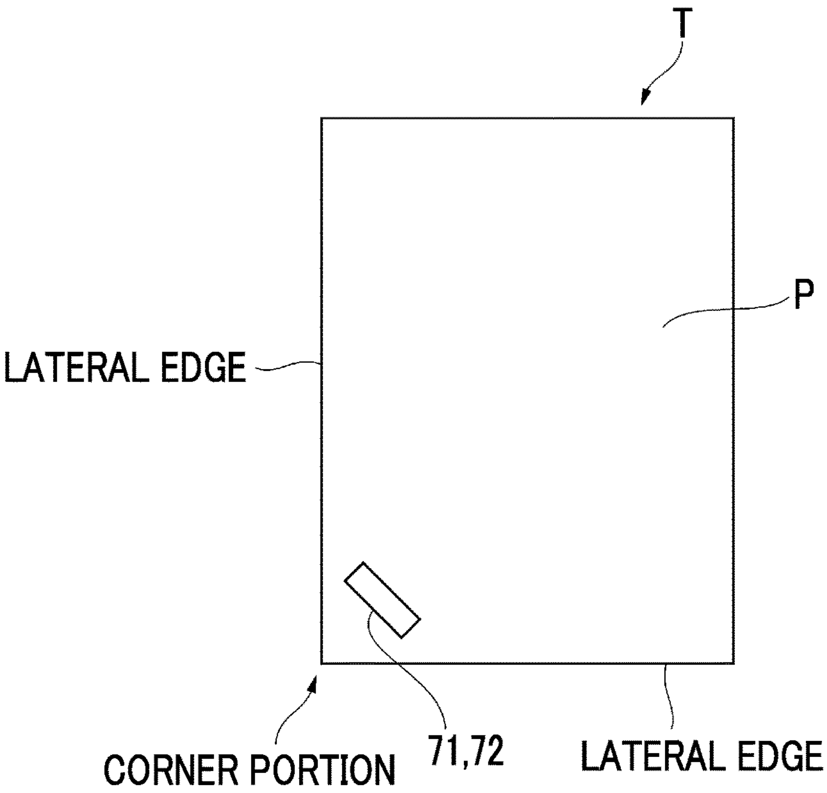
FIGS. 18A and 18B are diagrams illustrating binding positions.

For example, in a case where a specific position, which is a position specified by the binding position information, is a corner portion of the paper bundle T formed in a rectangular shape as illustrated in FIG. 18A (a diagram illustrating the binding position), the control unit 905 increases the movement amount of the second binding teeth 72 compared to a case where the specific position is other than the corner portion.

More specifically, as illustrated in FIG. 18A, in a case where the specific position is the corner portion of the recording medium bundle and the first binding teeth 71 and the second binding teeth 72 that perform the binding of the corner portion are disposed so as to intersect the lateral edge of the rectangular paper P, the control unit 905 increases the movement amount of the second binding teeth 72.

Figure 18B:
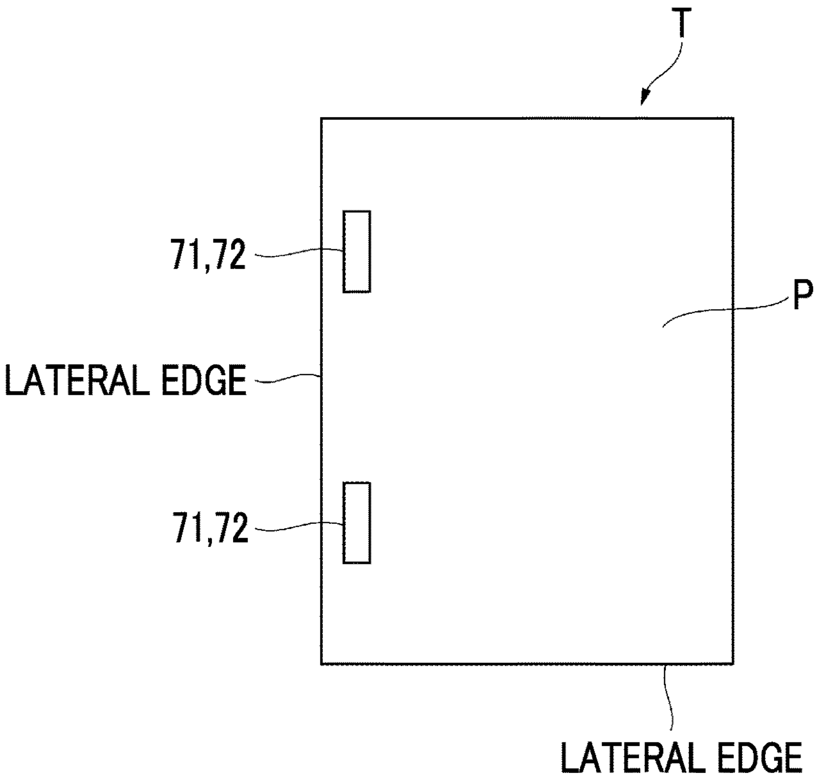

More specifically, in this case, the control unit 905 increases the movement amount of the second binding teeth 72 compared to a case where the specific position is the lateral edge and the first binding teeth 71 and the second binding teeth 72 are disposed along this lateral edge (refer to FIG. 18B).

Next, the control unit 905 controls the movement of the second binding teeth 72 such that the second binding teeth 72 reaches the position specified by the movement amount after the value thereof is increased, while monitoring the position of the second binding teeth 72 on the basis of the movement direction position detected by the tooth position detection unit 902.

Additionally, as illustrated in FIG. 18B, in a case where the specific position is the lateral edge and the first binding teeth 71 and the second binding teeth 72 are disposed along this lateral edge, the control unit 905 reduces the movement amount of the second binding teeth 72.

More specifically, compared to a case where the specific position is the corner portion of the recording medium bundle and the first binding teeth 71 and the second binding teeth 72 that perform the binding of the corner portion are disposed so as to intersect the lateral edge of the rectangular paper P (refer to FIG. 18A), the control unit 905 reduces the movement amount of the second binding teeth 72.

Next, the control unit 905 controls the movement of the second binding teeth 72 such that the second binding teeth 72 reaches the position specified by the movement amount after the value thereof is reduced, while monitoring the position of the second binding teeth 72 on the basis of the movement direction position detected by the tooth position detection unit 902.

In the present exemplary embodiment, as illustrated in FIG. 18B, in a case where the specific position is the lateral edge and the first binding teeth 71 and the second binding teeth 72 are disposed along this lateral edge, the movement amount of the second binding teeth 72 is kept as, for example, the above corrected movement amount.

In contrast, as illustrated in FIG. 18A, in a case where the specific position is the corner portion of the recording medium bundle and the first binding teeth 71 and the second binding teeth 72 that perform the binding of the corner portion are disposed so as to intersect the lateral edge of the rectangular paper P, the movement amount of the second binding teeth 72 is made larger than the corrected movement amount.

Alternatively, for example, as illustrated in FIG. 18B, in a case where the specific position is the lateral edge and the first binding teeth 71 and the second binding teeth 72 are disposed along this lateral edge, the movement amount of the second binding teeth 72 is made smaller than the corrected movement amount.

In contrast, as illustrated in FIG. 18A, in a case where the specific position is the corner portion of the recording medium bundle and the first binding teeth 71 and the second binding teeth 72 that perform the binding of the corner portion are disposed so as to intersect the lateral edge of the rectangular paper P, the movement amount of the second binding teeth 72 is set as the corrected movement amount.

Here, as illustrated in FIG. 18B, in a case where the specific position is the lateral edge and the first binding teeth 71 and the second binding teeth 72 are disposed along the lateral edge, the possibility that the direction in which the first binding teeth 71 and the second binding teeth 72 extends and the direction in which fibers constituting the paper P extend are along each other increases. In this case, the deformation of the paper P is likely to occur in a case where the first binding teeth 71 and the second binding teeth 72 are pushed against the paper P.

In this case, the load required for binding the paper bundle T is small, and in the present exemplary embodiment, as described above, the movement amount of the second binding teeth 72 is reduced to reduce the load acting on the binding of the paper bundle T.

In contrast, in a case where the specific position is the corner portion and the first binding teeth 71 and the second binding teeth 72 are disposed so as to intersect the lateral edge, the direction in which the first binding teeth 71 and the second binding teeth 72 extend and the direction in which the fibers constituting the paper P extend have a mutually intersecting relationship.

In this case, in a case where the first binding teeth 71 and the second binding teeth 72 are pushed against the paper bundle T, the deformation of the paper bundle T is less likely to occur, and the load required for binding the paper bundle T is further required.

For this reason, in the present exemplary embodiment, as described above, in a case where the specific position is the corner portion of the paper bundle T, and the first binding teeth 71 and the second binding teeth 72 are disposed in a relationship intersecting the lateral edge of the rectangular paper P, the movement amount of the second binding teeth 72 is increased.

Accordingly, in this case, the load acting on the paper bundle T becomes large, and the binding for the corner portion of the paper bundle T may be performed more reliably.

Figure 19:
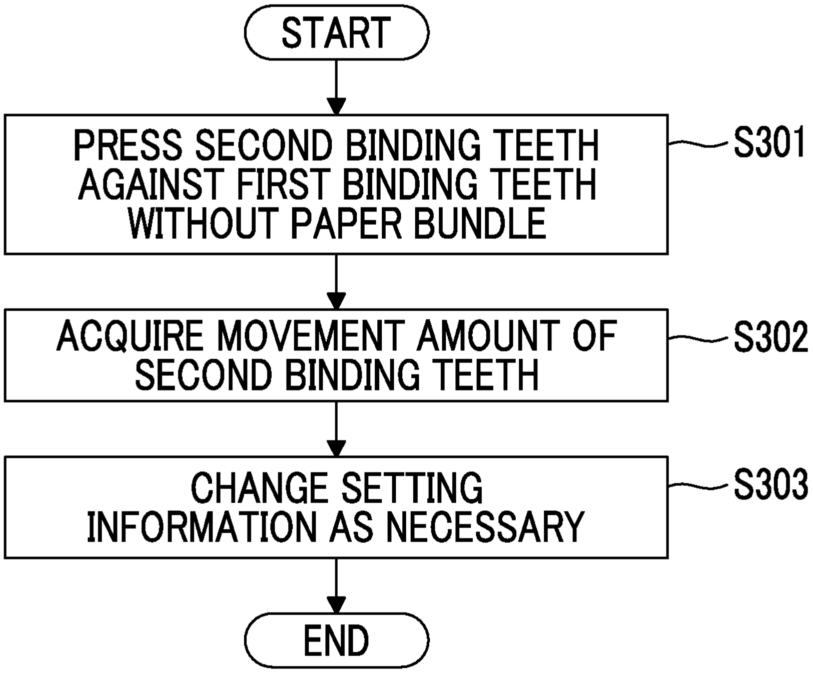
FIG. 19 is a flowchart illustrating a flow of the processing of pressing the second binding teeth against the first binding teeth.

FIG. 19 is a flowchart illustrating a flow of the processing of pressing the second binding teeth 72 against the first binding teeth 71.

In the present exemplary embodiment, as described above, the control unit 905 moves the second binding teeth 72 toward the first binding teeth 71 to press the second binding teeth 72 against the first binding teeth 71 in a state where there is no paper bundle T between the first binding teeth 71 and the second binding teeth 72 (Step S301).

In other words, as described above, the control unit 905 moves the second binding teeth 72 toward the first binding teeth 71 to press the second binding teeth 72 against the first binding teeth 71 in a state where there is no paper bundle T between the first binding teeth 71 and the second binding teeth 72.

Here, the detection of the state where there is no paper bundle T between the first binding teeth 71 and the second binding teeth 72 can be determined on the basis of, for example, the presence or absence of input of a job, and in a case where there is no input of a job, and in a case where there is no job input, no paper bundle T is determined to be between the first binding teeth 71 and the second binding teeth 72.

In addition, for example, a sensor for detecting the presence or absence of the paper bundle T between the first binding teeth 71 and the second binding teeth 72 may be provided, and the presence or absence of the paper bundle T between the first binding teeth 71 and the second binding teeth 72 may be determined on the basis of the detection result of this sensor.

In a case where the second binding teeth 72 is pressed against the first binding teeth 71 in a state where there is no paper bundle T between the first binding teeth 71 and the second binding teeth 72 as in the present exemplary embodiment, the posture of the first binding teeth 71 with respect to the second binding teeth 72 is corrected.

Here, in a case where the posture of the second binding teeth 72 is different from an originally predetermined posture, deterioration of the binding quality deteriorates.

In contrast, as in the present exemplary embodiment, in a case where the second binding teeth 72 is pressed against the first binding teeth 71 and the posture of the second binding teeth 72 is corrected, the posture of the second binding teeth 72 may be brought closer to the originally predetermined posture, and the deterioration of the binding quality may be suppressed.

In the present exemplary embodiment, first, in a case where the image forming system 1 is newly installed and the image forming system 1 is first started, the second binding teeth 72 is moved toward the first binding teeth 71, and the second binding teeth 72 is pressed against the first binding teeth 71.

Additionally, even after that, the second binding teeth 72 are pressed against the first binding teeth 71.

Specifically, in the present exemplary embodiment, for example, the second binding teeth 72 are moved toward the first binding teeth 71 at a timing between a timing at which the binding processing is performed on one paper bundle T and a timing at which the binding processing is performed on the other paper bundle T, and presses the second binding teeth 72 against the first binding teeth 71.

In the present exemplary embodiment, the binding processing for the paper bundle T is performed in order, and the second binding teeth 72 is pressed against the first binding teeth 71 during the binding processing.

The pressing of the second binding teeth 72 against the first binding teeth 71 may be performed at any time during the binding processing, for example, may be performed at a specific timing such as in a case where the power is turned on, in a case where there is an instruction from the user, or the like.

Additionally, the frequency of pressing the second binding teeth 72 against the first binding teeth 71 may be constant or may be changed.

In the present exemplary embodiment, the frequency of pressing the second binding teeth 72 against the first binding teeth 71 is set in advance, and the control unit 905 performs the pressing of the second binding teeth 72 against the first binding teeth 71 on the basis of this frequency.

In a case where the frequency is constant, the control unit 905 presses the second binding teeth 72 against the first binding teeth 71, for example, whenever binding processing number-of-times, which is the number of times of the binding processing, becomes a predetermined number of times.

Additionally, in a case where the frequency of pressing the second binding teeth 72 against the first binding teeth 71 is changed, for example, this frequency is changed depending on the number of times of the binding processing by the second binding processing device 52.

In other words, in a case where the frequency of pressing the second binding teeth 72 against the first binding teeth 71 is changed, this frequency is changed depending on the content of the processing by the second binding processing device 52.

Specifically, in a case where the frequency of pressing the second binding teeth 72 against the first binding teeth 71 is changed, this frequency is reduced depending on, for example, an increase in the number of times of the binding processing by the second binding processing device 52.

In a case where the frequency is reduced depending on the increase in the number of the binding processing, for example, the processing of pressing the second binding teeth 72 against the first binding teeth 71 is performed whenever a predetermined number of times (hereinafter referred to as "unit number-of-times") of the binding processing until the number of times of the binding processing by the second binding processing device 52 exceeds a predetermined threshold value.

Then, in a case where the number of times of the binding processing by the second binding processing device 52 exceeds this predetermined threshold value, the second binding teeth 72 is pressed against the first binding teeth 71 whenever the number of times is larger than the above unit number-of-times.

In the initial stage of use of the second binding processing device 52, each part of the device does not operate smoothly, and the posture of the second binding teeth 72 with respect to the first binding teeth 71 is likely to be disturbed due to this. In this case, although there is particular limitation, it is desired to increase the frequency of pressing the second binding teeth 72 against the first binding teeth 71.

On the other hand, in a case where the usage time of the second binding processing device 52 is extended, each part of the device becomes easier to operate smoothly, and the posture of the second binding teeth 72 with respect to the first binding teeth 71 is stabilized correspondingly.

In the present exemplary embodiment, in a case where the posture of the second binding teeth 72 with respect to the first binding teeth 71 is stabilized, the frequency with which the second binding teeth 72 is pressed against the first binding teeth 71 decreases.

In addition, the frequency may be changed in consideration of the load applied to the second binding processing device 52. More specifically, for example, in a case where the load applied to the second binding processing device 52 exceeds a predetermined threshold value, the frequency may be increased.

In a case where the load applied to the second binding processing device 52 becomes large, the posture of the second binding teeth 72 with respect to the first binding teeth 71 tends to be disturbed.

More specifically, for example, a case where the binding processing is repeatedly performed on the thick paper bundle T having a large number of sheets of the paper P is assumed. In this case, the load applied to the second binding processing device 52 becomes large, and accordingly, the posture of the second binding teeth 72 with respect to the first binding teeth 71 is likely to be disturbed.

In this case, in a case where the frequency is increased, the chances that the posture of the second binding teeth 72 with respect to the first binding teeth 71 is corrected increase, and problems such as deterioration of the binding quality are less likely to occur.

Here, the information on the load applied to the second binding processing device 52 is, for example, counting the number of times of the binding processing for the paper bundle T constituted by the number of sheets of the paper P exceeding a predetermined specific threshold value, and the frequency is increased in a case where this number of times exceeds the predetermined specific threshold value.

Accordingly, even in a case where the posture of the second binding teeth 72 with respect to the first binding teeth 71 is likely to be disturbed due to the load applied to the second binding processing device 52, the posture of the second binding teeth 72 with respect to the first binding teeth 71 is stabilized.

Additionally, in the present exemplary embodiment, as described above, in a case where the processing of pressing between the teeth are performed without the paper bundle T, the movement amount acquisition unit 906 acquires the movement amount of the second binding teeth 72 (Step S302).

Specifically, the movement amount acquisition unit 906 acquires the movement amount of the second binding teeth 72 that moves toward the first binding teeth 71 and the movement amount until the second binding teeth 72 reaches the first binding teeth 71 after the second binding teeth 72 departs from the initial position.

Specifically, as described above, the movement amount acquisition unit 906 acquires the movement amount of the second binding teeth 72 on the basis of the information on the rotation amount of the rotating body 810 provided in the position detection sensor 800.

In addition, as described above, the movement amount acquisition unit 906 determines whether or not the second binding teeth 72 has been pressed against the first binding teeth 71 by referring to, for example, the current value of the current supplied to the drive motor M.

Additionally, as described above, the movement amount acquisition unit 906 determines whether or not the second binding teeth 72 has been pressed against the first binding teeth 71 on the basis of the information on the rotation amount of the rotating body 810 output from the position detection sensor 800.

Thereafter, in the present exemplary embodiment, the information change unit 907 changes the setting information, which is the information set for the second binding teeth 72, as necessary, on the basis of the movement amount acquired by the movement amount acquisition unit 906 (Step S303).

More specifically, the information change unit 907 changes the setting information that is set for the second binding teeth 72 and affects the movement amount of the second binding teeth 72.

More specifically, the information change unit 907 changes the above initial reference movement amount as necessary on the basis of the movement amount acquired by the movement amount acquisition unit 906 and generates the above corrected movement amount.

The information change unit 907 changes the initial reference movement amount, which is the setting information on the movement amount in a case where the second binding teeth 72 moves toward the paper bundle T, to generate the above corrected movement amount, on the basis of the movement amount acquired by the movement amount acquisition unit 906.

In other words, in this case, the information change unit 907 changes the movement amount in a case where the second binding teeth 72 move toward the paper bundle T.

In the present exemplary embodiment, as described above, the initial reference movement amount is set, and the initial reference movement amount is registered in the information storage device 202 as the setting information.

The information change unit 907 changes the initial reference movement amount to generate the above corrected movement amount, on the basis of the movement amount acquired by the movement amount acquisition unit 906. Then, the information change unit 907 registers the generated corrected movement amount in the information storage device 202.

The control unit 905 controls the movement of the second binding teeth 72 on the basis of the corrected movement amount (new setting information after the change) registered in the information storage device 202 during the binding processing and moves the second binding teeth 72 to the advance position specified by the corrected movement amount on the basis of the movement direction position detected by the tooth position detection unit 902.

In this case, the second binding teeth 72 move to the advance position specified by the new setting information after the change.

For example, in a case where the movement amount acquired by the movement amount acquisition unit 906 is smaller than the first threshold value that is a predetermined value, the information change unit 907 changes the setting information (the initial reference movement amount) such that the movement amount in a case where the second binding teeth 72 moves toward the paper bundle T becomes smaller.

Additionally, in a case where the movement amount acquired by the movement amount acquisition unit 906 is larger than the second threshold value (>first threshold value) that is a predetermined value, the information change unit 907 changes the setting information (initial reference movement amount) such that the movement amount in a case where the second binding teeth 72 moves toward the paper bundle T becomes larger.

Accordingly, in the present exemplary embodiment, even in a case where the size of the gap between the first binding teeth 71 and the second binding teeth 72 is larger or smaller than the originally predetermined size, the second binding teeth 72 moves to the originally predetermined advance position.

In addition, in this processing example, two values to be targets for comparison with the movement amount acquired by the movement amount acquisition unit 906 are set as in the first threshold value and the second threshold value described above. However, the values (reference values) to be comparison targets may be one common value.

In this case, in a case where the movement amount acquired by the movement amount acquisition unit 906 (hereinafter referred to as "acquired movement amount") is smaller than this one common value (reference value), the setting information (initial reference movement amount) is changed such that the movement amount in a case where the second binding teeth 72 move toward the paper bundle T becomes smaller.

Specifically, in this case, for example, the information change unit 907 subtracts the acquired movement amount from the reference value to obtain a subtraction value and subtracts the subtraction value from the initial reference movement amount to set a value obtained by this as the above corrected movement amount.

Additionally, in a case where the acquired movement amount acquired by the movement amount acquisition unit 906 is larger than this one common value (reference value), the setting information (initial reference movement amount) is changed such that the movement amount in a case where the second binding teeth 72 moves toward the paper bundle T becomes larger.

Specifically, in this case, for example, the information change unit 907 subtracts the reference value from the acquired movement amount to obtain a subtraction value, and adds the subtraction value to the initial reference movement amount to set a value obtained by this as the above corrected movement amount.

Here, examples of the setting information that is set for the second binding teeth 72 and affects the movement amount of the second binding teeth 72 include the movement amount of the second binding teeth 72 as described above.

In addition, examples of the setting information that is set for the second binding teeth 72 and affects the movement amount of the second binding teeth 72 include the movement time of the second binding teeth 72.

The movement of the second binding teeth 72 can also be controlled on the basis of the movement time of the second binding teeth 72, and the advance position of the second binding teeth 72 can be changed by changing the movement time of the second binding teeth 72.

Additionally, examples of the setting information that is set for the second binding teeth 72 and affects the movement amount of the second binding teeth 72 include the value of a current supplied to the drive motor M, the supply time of this current, the value of a voltage applied to the drive motor M, the application time of this voltage, and the like.

By changing these values, the movement amount of the second binding teeth 72 is also changed, and the advance position of the second binding teeth 72 is changed.

Additionally, in the present exemplary embodiment, the position change unit 908 (refer to FIG. 14) is provided, and the position change unit 908 may change the initial position on the basis of the movement amount acquired by the movement amount acquisition unit 906.

In other words, in a case where the gap between the first binding teeth 71 and the second binding teeth 72 is large or small, the initial position may be changed to change the advance position of the second binding teeth 72.

In the present exemplary embodiment, in a case where the setting information is not changed by the information change unit 907 and in a case where the binding processing of the paper bundle T is performed by the second binding teeth 72, the second binding teeth 72 moves toward the paper bundle T from the predetermined initial position, by the movement amount specified by the initial reference movement amount.

In this case, the initial position may be changed on the basis of the movement amount acquired by the movement amount acquisition unit 906.

Specifically, in a case where the movement amount acquired by the movement amount acquisition unit 906 is smaller than the predetermined first threshold value, the initial position is changed such that the initial position moves in a direction away from the first binding teeth 71.

Additionally, in a case where the movement amount acquired by the movement amount acquisition unit 906 is larger than the predetermined second threshold value (>first threshold value), the initial position is changed such that the initial position moves in a direction approaching the first binding teeth 71.

More specifically, in a case where the movement amount acquired by the movement amount acquisition unit 906 is smaller than the predetermined first threshold value, for example, the initial position sensor 850 is moved in the direction away from the first binding teeth 71 to change the initial position.

Additionally, in a case where the movement amount acquired by the movement amount acquisition unit 906 is larger than the predetermined second threshold value (>first threshold value), for example, the initial position sensor 850 is moved in the direction approaching the first binding teeth 71 to change the initial position.

In addition, even in this case, two values to be targets for comparison with the movement amount acquired by the movement amount acquisition unit 906 are set as in the first threshold value and the second threshold value described above. However, the values (threshold values) to be comparison targets may be one common value similar to the above.

In this way, the initial position can be changed by moving the initial position sensor 850 to either the direction away from the first binding teeth 71 or the direction approaching the first binding teeth 71.

In the present exemplary embodiment, the initial position sensor 850 is provided in a fixed state, but in a case where the initial position sensor 850 is moved, a moving mechanism for moving the initial position sensor 850 is provided.

Then, the position change unit 908 transmits a control signal to this moving mechanism to move the initial position sensor 850. Accordingly, the starting point in a case where the second binding teeth 72 moves toward the first binding teeth 71 is changed, and the advance position of the second binding teeth 72 is also changed correspondingly.

In addition, for example, a plurality of the initial position sensors 850 lined up in the movement direction of the second binding teeth 72 may be provided, and the initial position may be changed by changing the initial position sensor 850 that stops the second binding teeth 72.

In addition, the initial position may be changed by providing a linear encoder extending in the movement direction of the second binding teeth 72.

In a case where the linear encoder is provided, the second binding teeth 72 can be stopped at an optional position, and in a case where the initial position is changed, the stop position of the second binding teeth 72 is changed to change the initial position.

Additionally, the respective configurations described above are not limited to the above-described exemplary embodiment and the modification examples thereof and can be changed without departing from the spirit. In other words, it should be understood that various changes in form and details are possible without departing from the spirit and scope of the claims.

For example, some of the respective configurations described above may be omitted, or other functions may be added to the respective configurations described above.

Additionally, although the plurality of exemplary embodiments have been described above, the configuration included in one exemplary embodiment and the configuration included in another exemplary embodiment may be replaced with each other, or the configuration included in one exemplary embodiment may be added to another exemplary embodiment.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A recording medium processing apparatus comprising:

first teeth that are used for binding processing of a recording medium bundle;

second teeth that move toward the first teeth and press the recording medium bundle located between the first teeth and the second teeth;

a position detection unit that detects a position of the second teeth;

a control unit that controls movement of the second teeth on the basis of the position detected by the position detection unit;

a recording medium bundle information acquisition unit that acquires recording medium bundle information that is information on the recording medium bundle; and a setting unit that sets a movement amount of the second teeth on the basis of the recording medium bundle information acquired by the recording medium bundle information acquisition unit, wherein the setting unit sets the movement amount of the second teeth on the basis of thickness information on a recording medium specified by the recording medium bundle information, wherein the setting unit sets the movement amount of the second teeth such that the movement amount of the second teeth in a case where a thickness specified by the thickness information is smaller than a predetermined threshold value is smaller than that in a case where the thickness is larger than the predetermined threshold value.

2. The recording medium processing apparatus according to claim 1, wherein the position detection unit acquires information on a movement amount of a portion interlocking with the movement of the second teeth to detect the position of the second teeth.

3. The recording medium processing apparatus according to claim 1, wherein the position detection unit acquires information on a rotation amount of a rotating portion rotating in conjunction with the movement of the second teeth to detect the position of the second teeth.

4. The recording medium processing device according to claim 3, wherein a driving force from a motor is transmitted to the second teeth via a rotatable gear to move the second teeth, and the position detection unit acquires information on a rotation amount of a rotating body disposed coaxially with the gear and detect the position of the second teeth.

5. The recording medium processing apparatus according to claim 1, wherein the control unit controls the movement of the second teeth on the basis of the movement amount set by the setting unit and the position detected by the position detection unit.

6. A recording medium processing apparatus comprising:

first teeth that are used for binding processing of a recording medium bundle;

second teeth that move toward the first teeth and press the recording medium bundle located between the first teeth and the second teeth;

a position detection unit that detects a position of the second teeth;

a control unit that controls movement of the second teeth on the basis of the position detected by the position detection unit;

a recording medium bundle information acquisition unit that acquires recording medium bundle information that is information on the recording medium bundle; and a setting unit that sets a movement amount of the second teeth on the basis of the recording medium bundle information acquired by the recording medium bundle information acquisition unit, wherein the setting unit sets the movement amount of the second teeth on the basis of sheet number information on a recording medium specified by the recording medium bundle information, wherein the setting unit sets the movement amount of the second teeth such that the movement amount of the second teeth in a case where a thickness specified by the sheet number information is smaller than a predetermined threshold value is smaller than that in a case where the number of sheets is larger than the predetermined threshold value.

7. A recording medium processing apparatus comprising:

first teeth that are used for binding processing of a recording medium bundle;

second teeth that move toward the first teeth and press the recording medium bundle located between the first teeth and the second teeth;

a binding position information acquisition unit that acquires binding position information that is information on a binding position by the first teeth and the second teeth in the recording medium bundle;

a tooth position detection unit that detects a movement direction position that is a position in a movement direction of the second teeth; and a control unit that controls the movement of the second teeth on the basis of the binding position information acquired by the binding position information acquisition unit and the movement direction position detected by the tooth position detection unit.

8. The recording medium processing apparatus according to claim 7, wherein, in a case where a specific position, which is a position specified by the binding position information, is a corner portion of the recording medium bundle formed in a rectangular shape, the control unit increases a movement amount of the second teeth compared to a case where the specific position is other than the corner portion.

9. The recording medium processing apparatus according to claim 8, wherein in a case where the specific position is the corner portion of the recording medium bundle, and the first teeth and the second teeth that perform binding of the corner portion are disposed in a relationship intersecting a lateral edge of the rectangular recording medium bundle, the control unit increases the movement amount of the second teeth compared to a case where the specific position is the lateral edge and the first teeth and the second teeth are disposed along the lateral edge.

10. An image forming system comprising:

an image forming apparatus that forms an image on a recording medium; and a recording medium processing apparatus that performs binding processing on a recording medium bundle including a plurality of sheets of recording mediums on which the image is formed by the image forming apparatus, wherein the recording medium processing apparatus is constituted by the recording medium processing apparatus according to claim 1.

11. An image forming system comprising:

an image forming apparatus that forms an image on a recording medium; and a recording medium processing apparatus that performs binding processing on a recording medium bundle including a plurality of sheets of recording mediums on which an image is formed by the image forming apparatus, wherein the recording medium processing apparatus is constituted by the recording medium processing apparatus according to claim 2.

12. An image forming system comprising:

an image forming apparatus that forms an image on a recording medium; and a recording medium processing apparatus that performs binding processing on a recording medium bundle including a plurality of sheets of recording mediums on which an image is formed by the image forming apparatus, wherein the recording medium processing apparatus is constituted by the recording medium processing apparatus according to claim 3.

13. An image forming system comprising:

an image forming apparatus that forms an image on a recording medium; and a recording medium processing apparatus that performs binding processing on a recording medium bundle including a plurality of sheets of recording mediums on which an image is formed by the image forming apparatus, wherein the recording medium processing apparatus is constituted by the recording medium processing apparatus according to claim 4.

14. An image forming system comprising:

an image forming apparatus that forms an image on a recording medium; and a recording medium processing apparatus that performs binding processing on a recording medium bundle including a plurality of sheets of recording mediums on which an image is formed by the image forming apparatus, wherein the recording medium processing apparatus is constituted by the recording medium processing apparatus according to claim 5.

15. An image forming system comprising:

an image forming apparatus that forms an image on a recording medium; and a recording medium processing apparatus that performs binding processing on a recording medium bundle including a plurality of sheets of recording mediums on which an image is formed by the image forming apparatus, wherein the recording medium processing apparatus is constituted by the recording medium processing apparatus according to claim 6.

* * * * *